US011643545B2

(12) United States Patent
Kawai et al.

(10) Patent No.: US 11,643,545 B2
(45) Date of Patent: May 9, 2023

(54) RESIN COMPOSITION

(71) Applicant: AJINOMOTO CO., INC., Tokyo (JP)

(72) Inventors: Kenji Kawai, Kawasaki (JP); Ryohei Ooishi, Kawasaki (JP)

(73) Assignee: AJINOMOTO CO., INC., Tokyo (JP)

( * ) Notice: Subject to any disclaimer, the term of this patent is extended or adjusted under 35 U.S.C. 154(b) by 60 days.

(21) Appl. No.: 16/937,158

(22) Filed: Jul. 23, 2020

(65) Prior Publication Data

US 2021/0032457 A1 Feb. 4, 2021

(30) Foreign Application Priority Data

Jul. 30, 2019 (JP) .............................. JP2019-140112

(51) Int. Cl.
| | |
|---|---|
| *C08L 63/08* | (2006.01) |
| *C08K 3/36* | (2006.01) |
| *C08K 5/105* | (2006.01) |
| *C08L 63/10* | (2006.01) |
| *C08L 61/14* | (2006.01) |
| *B32B 27/38* | (2006.01) |
| *B32B 27/08* | (2006.01) |
| *B32B 27/20* | (2006.01) |
| *B32B 27/26* | (2006.01) |

(52) U.S. Cl.
CPC .............. *C08L 63/08* (2013.01); *B32B 27/08* (2013.01); *B32B 27/20* (2013.01); *B32B 27/26* (2013.01); *B32B 27/38* (2013.01); *C08K 3/36* (2013.01); *C08K 5/105* (2013.01); *C08L 61/14* (2013.01); *C08L 63/10* (2013.01)

(58) Field of Classification Search
CPC .......... C08L 63/08; C08L 61/14; C08L 63/10; C08L 63/00; C08L 61/34; C08L 2205/03; C08L 63/04; B32B 27/08; B32B 27/20; B32B 27/26; B32B 27/38; B32B 15/085; B32B 15/092; B32B 17/06; B32B 27/281; B32B 27/285; B32B 27/32; C08K 3/36; C08K 5/105; C08K 3/013; C08G 14/10; C08G 59/027; C08G 59/4042; C08G 59/1477; C08G 59/245; C09D 163/00; C09D 7/62; C09D 7/65; C09D 7/70; C08J 7/042; C08J 7/0427; C08J 2367/02; C08J 2463/00; C08J 5/18; H05K 1/0326
See application file for complete search history.

(56) References Cited

U.S. PATENT DOCUMENTS

| | | | | |
|---|---|---|---|---|
| 10,059,798 B2* | 8/2018 | Arita | ...................... | C08G 63/00 |
| 2006/0157872 A1* | 7/2006 | Kotani | ................ | C09D 163/00 |
| | | | | 257/787 |
| 2014/0329927 A1* | 11/2014 | Ha | ........................ | C09J 147/00 |
| | | | | 522/42 |
| 2015/0240071 A1* | 8/2015 | Okamoto | ................ | C08L 63/00 |
| | | | | 428/195.1 |
| 2018/0111293 A1* | 4/2018 | Konagawa | ............. | B32B 27/36 |

FOREIGN PATENT DOCUMENTS

| | | |
|---|---|---|
| JP | H9-025393 | 1/1997 |
| JP | 2015-17247 A | 1/2015 |
| JP | 2016-027097 A | 2/2016 |
| JP | 2018-002887 | 1/2018 |
| JP | 2019-014843 A | 1/2019 |

OTHER PUBLICATIONS

DIC, "DIC Epoxy Resin Products for Composite", 2018, https://www.dic-global.com/pdf/products/catalog/dic_epoxy_for_composite_en.pdf (Year: 2018).*
DIC, "DIC Novolac Phenol Resin for Curing Agents", 2022, https://www.dic-global.com/en/products/epoxy/phenolite/ (Year: 2022).*
Japanese Office Action dated Jul. 12, 2022 in Japanese Patent Application No. 2019-140112, 6 pages.
Office Action dated Oct. 4, 2022, in corresponding Japanese Patent Application No. 2019-140112 (with English translation).

* cited by examiner

*Primary Examiner* — Cheng Yuan Huang
*Assistant Examiner* — Bethany M Miller
(74) *Attorney, Agent, or Firm* — Oblon, McClelland, Maier & Neustadt, L.L.P.

(57) ABSTRACT

A resin composition includes (A) a polyolefin epoxy resin, (B) an epoxy resin having a condensed polycyclic aromatic hydrocarbon, (C) a nitrogen-containing novolak resin, and (D) an inorganic filler, in which an epoxy equivalent of the (A) component is 200 g/eq. or more, a nitrogen content in the (C) component is 13% by mass or more and/or the (C) component has a cresol novolak structure, and a content of the (D) component is 60% by mass or more on the basis of 100% by mass of non-volatile components in the resin composition.

13 Claims, No Drawings

RESIN COMPOSITION

BACKGROUND OF THE INVENTION

1. Field of the Invention

The present invention relates to a resin composition including an epoxy resin. The present invention further relates to a cured product, a sheet-like laminate material, a resin sheet, a printed wiring board, and a semiconductor device, all being obtained by using this resin composition.

2. Description of the Related Art

A build-up method in which an insulating layer and a conductive layer are alternately piled up has been known as a manufacturing technology of a printed wiring board. In the manufacturing method using the build-up method, in general, an insulating layer is formed by curing a resin composition.

In general, the printed wiring board is exposed to a wide temperature environment ranging from a low temperature environment such as a room temperature to a high temperature environment such as a reflow temperature; thus, if a linear thermal expansion coefficient thereof is high and if size stability is low, a resin material in the insulating layer repeats expansion and shrinkage, thereby causing a crack due to the resulting strain.

A known method to lower the linear thermal expansion coefficient thereof is to fill the resin material with a large amount of an inorganic filler (Japanese Patent Application Laid-open No. 2016-27097). However, if the resin material is filled with a large amount of the inorganic filler, an elastic modulus thereof becomes so high that to suppress a warp becomes difficult.

So far, a resin composition including a polyolefin epoxy resin has been known (Japanese Patent Application Laid-open No. 2019-14843).
Patent Document 1:
Japanese Patent Application Laid-open No. 2016-27097
Patent Document 2:
Japanese Patent Application Laid-open No. 2019-14843

SUMMARY OF THE INVENTION

An object of the present invention is to provide, among others, a resin composition that can give a cured product having a suppressed warp as well as a superior crack resistance.

The inventors of the present invention carried out an extensive investigation to achieve the object of the present invention; and as a result, it was found that when a resin composition including (A) a polyolefin epoxy resin having an epoxy equivalent of 200 g/eq. or more, (B) an epoxy resin having a condensed polycyclic aromatic hydrocarbon, (C) a nitrogen-containing novolak resin having a nitrogen content of 13% by mass or more and/or having a cresol novolak structure, and (D) an inorganic filler with a content of 60% by mass or more was used, a cured product having a suppressed warp as well as a superior crack resistance could be obtained. The present invention was accomplished on the basis of this finding.

Namely, the present invention includes following contents.
[1] A resin composition comprising (A) a polyolefin epoxy resin, (B) an epoxy resin having a condensed polycyclic aromatic hydrocarbon, (C) a nitrogen-containing novolak resin, and (D) an inorganic filler, wherein
an epoxy equivalent of the (A) component is 200 g/eq. or more,
a nitrogen content in the (C) component is 13% by mass or more and/or the (C) component has a cresol novolak structure, and
a content of the (D) component is 60% by mass or more on the basis of 100% by mass of non-volatile components in the resin composition.
[2] The resin composition according to [1], wherein the (A) component is a polybutadiene epoxy resin.
[3] The resin composition according to [1] or [2], wherein the epoxy equivalent of the (A) component is 250 g/eq. or less.
[4] The resin composition according to any of [1] to [3], wherein a number-average molecular weight (Mn) of the (A) component is 4,000 or less.
[5] The resin composition according to any of [1] to [4], wherein a content of the (A) component is 1.5% by mass or more and 10% by mass or less on the basis of 100% by mass of non-volatile components in the resin composition.
[6] The resin composition according to any of [1] to [5], wherein an epoxy equivalent of the (B) component is 130 g/eq. or more and 400 g/eq. or less.
[7] The resin composition according to any of [1] to [6], wherein a content of the (B) component is 2% by mass or more and 20% by mass or less on the basis of 100% by mass of non-volatile components in the resin composition.
[8] The resin composition according to any of [1] to [7], wherein a mass ratio of the (A) component to the (B) component (content of (A) component/content of (B) component) is 0.1 or more and 0.5 or less.
[9] The resin composition according to any of [1] to [8], wherein the (C) component is a triazine-containing novolak resin.
[10] The resin composition according to any of [1] to [9], wherein a hydroxy equivalent of the (C) component is 130 g/eq. or more.
[11] The resin composition according to any of [1] to [10], wherein the (D) component is silica.
[12] The resin composition according to any of [1] to [11], wherein a content of the (D) component is 70% by mass or more on the basis of 100% by mass of non-volatile components in the resin composition.
[13] The resin composition according to any of [1] to [12], further comprising (E) a curing agent as a component other than the (C) component.
[14] The resin composition according to [13], wherein the (E) component comprises an active ester type curing agent.
[15] A cured product of the resin composition according to any of [1] to [14].
[16] A sheet-like lamination material comprising the resin composition according to any of [1] to [14].
[17] A resin sheet comprising a support and a resin composition layer formed of the resin composition according to any of [1] to [14] and formed on the support.
[18] A printed wiring board comprising an insulating layer comprising a cured product of the resin composition according to any of [1] to [14].
[19] A semiconductor device comprising the printed wiring board according to [18].

With a resin composition according to the present invention, a cured product having a suppressed warp as well as a superior crack resistance can be obtained.

DETAILED DESCRIPTION OF THE PREFERRED EMBODIMENTS

Hereinafter, the present invention will be explained in detail on the basis of the preferred embodiments thereof. The present invention is, however, not limited to the embodiments nor to the exemplified materials described below; the present invention can be carried out with an arbitrary modification thereof so far as the modified embodiments and materials are not outside the claims or the equivalents thereof.

Resin Composition

The resin composition according to the present invention includes (A) a polyolefin epoxy resin having an epoxy equivalent of 200 g/eq. or more, (B) an epoxy resin having a condensed polycyclic aromatic hydrocarbon, (C) a nitrogen-containing novolak resin having a nitrogen content of 13% by mass or more and/or having a cresol novolak structure, and (D) an inorganic filler with a content of 60% by mass or more. When the resin composition as described above is used, a cured product having a suppressed warp as well as a superior crack resistance can be obtained.

The resin composition according to the present invention may further include arbitrary components, in addition to (A) the polyolefin epoxy resin, (B) the epoxy resin having a condensed polycyclic aromatic hydrocarbon, (C) the nitrogen-containing novolak resin, and (D) the inorganic filler. Illustrative examples of the arbitrary component include (E) a curing agent, (F) a curing accelerator, (G) other additives, and (H) an organic solvent. Hereinafter, these components included in the resin composition will be explained in detail.

(A) Polyolefin Epoxy Resin

The resin composition according to the present invention includes (A) a polyolefin epoxy resin. (A) The polyolefin epoxy resin means a polymer having two or more epoxy groups introduced therein, the polymer being of an olefin such as ethylene, propylene, butadiene, and isoprene; preferable is a polymer of butadiene having two or more epoxy groups introduced therein, that is, a polybutadiene epoxy resin. The polybutadiene epoxy resin is preferably an epoxidized 1,2-polybutadiene that is obtained, for example, by partially oxidizing a vinyl portion of 1,2-polybutadiene so as to introduce the epoxy groups therein. The polybutadiene epoxy resin like this may not only be partially or entirely hydrogenated but also have other structures such as a polyethylene structure, a polypropylene structure, a polyurethane structure, and a polyester structure. In addition, this may have a functional group introduced into the molecular thereof, the functional group being such as an acryloyl group, a methacryloyl group, an isocyanate group, a carboxy group, a hydroxy group, and an amino group.

(A) The polyolefin epoxy resin is preferably a polybutadiene epoxy resin having a structure represented by the following formula (1):

[Chem. 1]

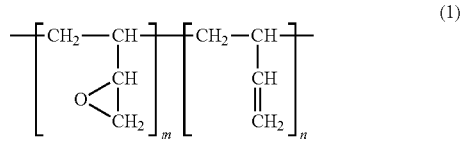

(1)

wherein n represents an integer of 10 to 300, and m represents an integer of 3 to 150.

When (A) the polyolefin epoxy resin includes the structure represented by the formula (1), the content of the structure represented by the formula (1) therein is preferably 80% by mass or more, more preferably 85% by mass or more, and still more preferably 90% by mass or more, while especially preferably 95%, by mass or more.

In the formula (1), n is preferably in the range of 10 to 200, and more preferably in the range of 10 to 100, while especially preferably in the range of 10 to 60; and m is preferably in the range of 3 to 100, and more preferably in the range of 3 to 50, while especially preferably in the range of 3 to 30.

(A) The polyolefin epoxy resin includes a polyolefin epoxy resin having preferably 3 or more epoxy groups in one molecule, while more preferably 4 or more epoxy groups in one molecule.

The epoxy equivalent of (A) the polyolefin epoxy resin is 200 g/eq. or more. The upper limit of the epoxy equivalent of (A) the polyolefin epoxy resin is not particularly restricted, and it is preferably 1,000 g/eq. or less, more preferably 500 g/eq. or less, and still more preferably 300 g/eq. or less, while especially preferably 250 g/eq. or less. The epoxy equivalent is a mass of the resin per one equivalent of the epoxy resin. The epoxy equivalent can be measured with the method in accordance with JIS K7236.

The viscosity (45° C.) of (A) the polyolefin epoxy resin is preferably 3,000 Pa·s or less, more preferably 1,000 Pa's or less, and still more preferably 500 Pa·s or less, while especially preferably 200 Pa·s or less.

The number-average molecular weight (Mn) of (A) the polyolefin epoxy resin is not particularly restricted, and it is preferably 500 or more, more preferably 800 or more, and still more preferably 1,000 or more, while especially preferably 1,200 or more. The upper limit of the number-average molecular weight (Mn) of (A) the polyolefin epoxy resin is not particularly restricted, and it is preferably 10,000 or less, more preferably 7,000 or less, and still more preferably 5,000 or less, while especially preferably 4,000 or less.

The glass transition temperature (Tg) of (A) the polyolefin epoxy resin is not particularly restricted, and it is preferably 20"C or lower, and more preferably 10° C. or lower, while especially preferably 0° C. or lower. The lower limit of the glass transition temperature (Tg) of (A) the polyolefin epoxy resin can be, for example, −70° C. or higher, −80° C. or higher, or the like.

Illustrative examples of (A) the polyolefin epoxy resin that is commercially available include "JP-100" (epoxy equivalent of about 210 g/eq. and Mn of 1,300), "JP-200" (epoxy equivalent of about 225 g/eq. and Mn of 2,200), and "JP-400" (epoxy equivalent of about 230 g/eq. and Mn of 3,500), all being manufactured by Nippon Soda Co., Ltd.

The content of (A) the polyolefin epoxy resin in the resin composition is not particularly restricted, and it is preferably 0.5% by mass or more, more preferably 1% by mass or more, and still more preferably 1.5% by mass or more, while especially preferably 2% by mass or more, on the basis of 100% by mass of non-volatile components in the resin composition. The upper limit of the content of (A) the polyolefin epoxy resin is not particularly restricted, and it is preferably 30% by mass or less, more preferably 20% by mass or less, and still more preferably 10% by mass or less, while especially preferably 5% by mass or less, on the basis of 100% by mass of non-volatile components in the resin composition.

(B) Epoxy Resin having Condensed Polycyclic Aromatic Hydrocarbon

The resin composition according to the present invention includes (B) an epoxy resin having a condensed polycyclic aromatic hydrocarbon. (B) The epoxy resin having a condensed polycyclic aromatic hydrocarbon means a resin having one or more condensed polycyclic aromatic hydrocarbon rings and two or more epoxy groups in one molecule. The condensed aromatic hydrocarbon ring is an aromatic hydrocarbon ring having two or more rings that is obtained by condensation of two or more benzene rings, in which the number of carbon atoms is preferably in the range of 10 to 18, while more preferably in the range of 10 to 14; and illustrative examples thereof include a naphthalene ring, an anthracene ring, and a phenanthrene ring, and a naphthalene ring is especially preferable.

Illustrative examples of (B) the epoxy resin having the condensed polycyclic aromatic hydrocarbon include: epoxy resins having one condensed aromatic hydrocarbon ring in one molecule such as 1,6-bis(glycidyloxy)naphthalene, 1,5-bis(glycidyloxy)naphthalene, and 2,7-bis(glycidyloxy)naphthalene; epoxy resins having two condensed aromatic hydrocarbon ring in one molecule such as bis[2-(glycidyloxy)-1-naphthyl]methane, bis[2,7-bis(glycidyloxy)-1-naphthyl]methane, and [2,7-bis(glycidyloxy)-1-naphthyl] [2-(glycidyloxy)-1-naphthyl]methane; and epoxy resins having two or more condensed aromatic hydrocarbon ring in one molecule such as a naphthol novolak epoxy resin, a naphthol-phenol co-condensed novolak epoxy resin, a naphthol-cresol co-condensed novolak epoxy resin, a naphthol aralkyl epoxy resin, a naphthalenediol aralkyl epoxy resin, and a naphthylene ether epoxy resin.

The epoxy equivalent of (B) the epoxy resin having the condensed polycyclic aromatic hydrocarbon is not particularly restricted, and it is preferably 50 g/eq. or more, more preferably 100 g/eq. or more, still more preferably 120 g/eq. or more, and far more preferably 130 g/eq. or more, while especially preferably 140 g/eq. or more. The upper limit of the epoxy equivalent of (B) the epoxy resin having the condensed polycyclic aromatic hydrocarbon is not particularly restricted, and it is preferably 1,000 g/eq. or less, more preferably 700 g/eq. or less, still more preferably 500 g/eq. or less, and far more preferably 450 g/eq. or less, while especially preferably 400 g/eq. or less.

Illustrative examples of (B) the epoxy resin having the condensed polycyclic aromatic hydrocarbon that is commercially available include: "HP-4032D" and "HP-4032SS" (these are epoxy resins having one naphthalene ring in one molecule: manufactured by DIC Corp.); "EXA-4750", "HP-4770", "HP-4700", and "HP-4710" (these are epoxy resins having two naphthalene rings in one molecule: manufactured by DIC corp.); "ESN-155", "ESN-185V", "ESN-175", "ESN-475V", "ESN-485", and "TX-1507B" (these are naphthol aralkyl epoxy resins: manufactured by Nippon Steel Chemical & Material Co., Ltd.); "EXA-7311", "EXA-7311-G3", "EXA-7311-G4", "EXA-7311-G4S", "HP-6000", and "HP-6000-L" (these are naphthylene ether epoxy resins: manufactured by DIC Corp.); and "NC7000L" (a naphthol novolak epoxy resin: manufactured by Nippon Kayaku Co., Ltd.).

The content of (B) the epoxy resin having the condensed polycyclic aromatic hydrocarbon in the resin composition is not particularly restricted, and in view of suppressing a warp, the content thereof is preferably 2% by mass or more, more preferably 3% by mass or more, and still more preferably 5% by mass or more, while especially preferably 7% by mass or more, on the basis of 100% by mass of non-volatile components in the resin composition. The upper limit of the content of (B) the epoxy resin having the condensed polycyclic aromatic hydrocarbon is not particularly restricted, and it is preferably 40% by mass or less, more preferably 30% by mass or less, and still more preferably 20% by mass or less, while especially preferably 15% by mass or less, on the basis of 100% by mass of non-volatile components in the resin composition.

The mass ratio of the content of (A) the polyolefin epoxy resin to the content of (B) the epoxy resin having the condensed polycyclic aromatic hydrocarbon (content of (A) component/content of (B) component) in the resin composition is not particularly restricted, and it is preferably 0.05 or more, more preferably 0.1 or more, and still more preferably 0.15 or more, while especially preferably 0.2 or more. The upper limit of the mass ratio is not particularly restricted, and it is preferably 1 or less, more preferably 0.7 or less, and still more preferably 0.5 or less, while especially preferably 0.4 or less.

(C) Nitrogen-containing Novolak Resin

The resin composition according to the present invention includes (C) a nitrogen-containing novolak resin. (C) The nitrogen-containing novolak resin is a resin having a nitrogen atom as well as a novolak structure in the molecule thereof. (C) The nitrogen-containing novolak resin can have a function as a curing agent to cure epoxy resins including the (A) component and the (B) component.

In the present invention, (C) the nitrogen-containing novolak resin has (C1) a nitrogen content of 13% by mass or more (this embodiment is called "first embodiment"), or has (C2) a cresol novolak structure (this embodiment is called "second embodiment"), or has (C3) a nitrogen content of 13% by mass or more and a cresol novolak structure (this embodiment is called "third embodiment"). The nitrogen content means a mass ratio of the nitrogen atom that constitutes the (C) component molecule.

In the first embodiment, (C) the nitrogen-containing novolak resin preferably has a structure in which a general novolak structure is further bonded with one, or two or more nitrogen-containing hetero ring groups. Here, the general novolak structure is composed such that aromatic carbon atoms in two or more phenol structures are connected via a methylene group, the phenol structures being phenol, cresols (specifically, o-cresol, m-cresol, and p-cresol), benzene diols (specifically catechol, resorcinol, and hydroquinone), naphthols (specifically 1-naphthol and 2-naphthol), and the like. In the second embodiment and the third embodiment, (C) the nitrogen-containing novolak resin preferably has a structure in which a cresol novolak structure is further bonded with one, or two or more nitrogen-containing hetero ring groups, the cresol novolak structure being composed such that aromatic carbon atoms in two or more cresols (specifically, o-cresol, m-cresol, and p-cresol) are connected via a methylene group.

Illustrative examples of the nitrogen-containing hetero ring include nitrogen-containing aromatic hetero rings such as a pyrrole ring, a pyridine ring, a pyrazole ring, a triazole ring, a pyrimidine ring, a pyrazine ring, and a triazine ring. Among them, a triazine ring is preferable. In addition, it is preferable that the nitrogen-containing hetero ring group contain one, or two or more amino groups.

In particular, among (C) the nitrogen-containing novolak resins, a triazine-containing novolak resin having a structure in which one, or two or more melamines (namely, triaminotriazines) are bonded with the novolak structure via an amino group is more preferable.

It is especially preferable that (C) the nitrogen-containing novolak resin is a triazine-containing cresol novolak resin having a structure represented by the following formula (2):

[Chem. 2]

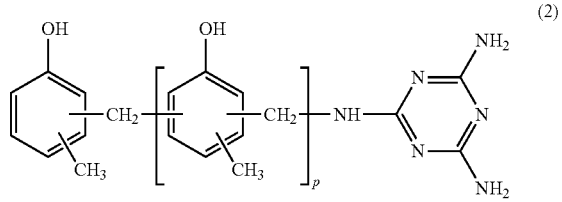

(2)

wherein p represents an integer of 1 to 30.

In the first embodiment and the third embodiment, the nitrogen content in (C) the nitrogen-containing novolak resin is 13% by mass or more, preferably 14% by mass or more, and more preferably 15% by mass or more, while especially preferably 16% by mass or more. In the second embodiment, the nitrogen content in (C) the nitrogen-containing novolak resin is not particularly restricted, and it is preferably 5% by mass or more, 8% by mass or more, more preferably 10% by mass or more, 12% by mass or more, 13% by mass or more, still more preferably 14% by mass or more, and 15% by mass or more, while especially preferably 16% by mass or more, or 17% by mass or more. In the first embodiment, the second embodiment, and the third embodiment, the upper limit of the nitrogen content in (C) the nitrogen-containing novolak resin is not particularly restricted, and this can be, for example, 30% by mass or less, 25% by mass or less, 22% by mass or less, or the like.

The hydroxy equivalent of (C) the nitrogen-containing novolak resin is not particularly restricted, and it is preferably 100 g/eq. or more, more preferably 110 g/eq. or more, still more preferably 120 g/eq. or more, and far more preferably 130 g/eq. or more, while especially preferably 140 g/eq. or more. The upper limit of the hydroxy equivalent of (C) the nitrogen-containing novolak resin is not particularly restricted, and it is preferably 300 g/eq. or less, more preferably 200 g/eq. or less, still more preferably 180 g/eq. or less, and far more preferably 170 g/eq. or less, while especially preferably 160 g/eq. or less. The hydroxy equivalent is a mass of the resin per 1 equivalent of the hydroxy group.

Illustrative examples of (C) the nitrogen-containing novolak resin that is commercially available include "LA3018-50P", "LA1356", and "LA7751", all being manufactured by DIC Corp.

The content of (C) the nitrogen-containing novolak resin in the resin composition is not particularly restricted, and it is preferably 0.01% by mass or more, more preferably 0.1% by mass or more, and still more preferably 0.3% by mass or more, while especially preferably 0.5% by mass or more, on the basis of 100% by mass of non-volatile components in the resin composition. The upper limit of the content of (C) the nitrogen-containing novolak resin is not particularly restricted; and it is preferably 40% by mass or less, more preferably 30% by mass or less, and still more preferably 20% by mass or less, while especially preferably 10% by mass or less, on the basis of 100% by mass of non-volatile components in the resin composition.

The mass ratio of the content of (A) the polyolefin epoxy resin to the content of (C) the nitrogen-containing novolak resin (content of (A) component/content of (C) component) in the resin composition is not particularly restricted, and it is preferably 0.1 or more, more preferably 0.15 or more, still more preferably 0.2 or more, and far more preferably 0.25 or more, while especially preferably 0.3 or more. The upper limit of the mass ratio is not particularly restricted, and it is preferably 20 or less, more preferably 15 or less, still more preferably 10 or less, and far more preferably 7 or less, while especially preferably 5 or less.

The mass ratio of the content of (B) the epoxy resin having the condensed polycyclic aromatic hydrocarbon to the content of (C) the nitrogen-containing novolak resin (content of (B) component/content of (C) component) in the resin composition is not particularly restricted, and it is preferably 0.1 or more, more preferably 0.5 or more, still more preferably 0.8 or more, and far more preferably 1 or more, while especially preferably 1.2 or more. The upper limit of the mass ratio is not particularly restricted, and it is preferably 50 or less, more preferably 40 or less, still more preferably 30 or less, and far more preferably 20 or less, while especially preferably 15 or less.

(D) Inorganic Filler

The resin composition according to the present invention includes (D) an inorganic filler. (D) The inorganic filler is included in the state of particles in the resin composition.

Inorganic compounds are used as (D) the inorganic filler. Illustrative examples of (D) the inorganic filler include silica, alumina, glass, cordierite, silicon oxide, barium sulfate, barium carbonate, talc, clay, mica powder, zinc oxide, hydrotalcite, boehmite, aluminum hydroxide, magnesium hydroxide, calcium carbonate, magnesium carbonate, magnesium oxide, boron nitride, aluminum nitride, manganese nitride, aluminum borate, strontium carbonate, strontium titanate, calcium titanate, magnesium titanate, bismuth titanate, titanium oxide, zirconium oxide, barium titanate, barium titanate zirconate, barium zirconate, calcium zirconate, zirconium phosphate, and zirconium phosphate tungstate. Among them, silica is especially preferable. Illustrative examples of the silica include amorphous silica, fused silica, crystalline silica, synthesized silica, and hollow silica. Spherical silica is preferable as the silica. (D) The inorganic filler may be used singly or as a combination of two or more of them with an arbitrary ratio.

Illustrative examples of (D) the inorganic filler that is commercially available include "UFP-30" (manufactured by Denka Co., Ltd.); "SP60-05" and "SP507-05" (both are manufactured by Nippon Steel & Sumikin Materials Co., Ltd.); "YC100C", "YA050C", "YA050C-MJE", and "YA010C" (these are manufactured by Admatechs Co., Ltd.); "UFP-30" (manufactured by Denka Co., Ltd.); "Silfil NSS-3N", "Silfil NSS-4N", and "Silfil NSS-5N" (these are manufactured by Tokuyama Corp.); "SC2500SQ", "SO-C4", "SO-C2", and "SO-C1" (these are manufactured by Admatechs Co., Ltd.); and "DAW-03" and "FB-105FD" (both are manufactured by Denka Co., Ltd.).

The average particle diameter of (D) the inorganic filler is not particularly restricted, and it is preferably 40 μm or less, more preferably 10 μm or less, still more preferably 5 μm or less, and far more preferably 3 μm or less, while especially preferably 2 μm or less. The lower limit of the average particle diameter of (D) the inorganic filler is not particularly restricted, and it is preferably 0.005 μm or more, more preferably 0.01 μm or more, and still more preferably 0.05 μm or more, while especially preferably 0.1 μm or more. The average particle diameter of (D) the inorganic filler may be measured with a laser diffraction/scattering method based on the Mie scattering theory. Specifically, the particle diameter distribution of the inorganic filler on the volume basis is prepared by means of a laser diffraction scattering type particle diameter distribution measurement apparatus, and the average particle diameter thereof is measured from the median diameter thus obtained. The measurement sample to be used is obtained by weighing 100 mg of an inorganic filler and 10 g of methyl ethyl ketone into a vial bottle, followed by dispersing this mixture for 10 minutes by ultrasound. The particle diameter distribution of the measurement sample of the inorganic filler on the volume basis is measured with a flow cell method using the light source wave lengths of blue light and red light by means of the laser diffraction type particle diameter distribution measurement apparatus; and the average particle diameter thereof can be calculated as the median diameter from the particle diameter distribution thus obtained. Illustrative examples of the laser diffraction type particle diameter distribution measurement apparatus include "LA-960" manufactured by Horiba Ltd.

The specific surface area of (D) the inorganic filler is not particularly restricted, and it is preferably 0.1 $m^2/g$ or more, and more preferably 0.5 $m^2/g$ or more, while especially preferably 1 $m^2/g$ or more. The upper limit of the specific surface area of (D) the inorganic filler is not particularly restricted, and it is preferably 60 $m^2/g$ or less, and more preferably 50 $m^2/g$ or less, while especially preferably 40 $m^2/g$ or less. The specific surface area of the inorganic filler may be calculated by means of a BET multipoint method, in which a nitrogen gas is adsorbed onto the sample surface in accordance with a BET method by using a specific surface area measurement apparatus (Macsorb HM-1210, manufactured by Mountech Co. Ltd.).

(D) The inorganic filler is preferably surface-modified with a suitable surface modifying agent. The humidity resistance and the dispersion property of (D) the inorganic filler may be enhanced by the surface modification. Illustrative examples of the surface modifying agent include silane coupling agents such as: vinyl silane coupling agents such as vinyltrimethoxysilane, and vinyltriethoxysilane; epoxy silane coupling agents such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane; styryl silane coupling agents such as p-styryltrimethoxysilane; methacryl silane coupling agents such as 3-methacryloxypropylmethyldimethoxysilane, 3-methacryloxypropyltrimethoxysilane, 3-methacryloxypropylmethyldiethoxysilane, and 3-methacryloxypropyltriethoxysilane; acryl silane coupling agents such as 3-acryloxypropyltrimethoxysilane; amino silane coupling agents such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, N-phenyl-8-aminooctyltrimethoxysilane, and N-(vinylbenzyl)-2-aminoethyl-3-aminopropyltrimethoxysilane; isocyanurate silane coupling agents such as tris-(trimethoxysilylpropyl) isocyanurate; ureido silane coupling agents such as 3-ureidopropyltrialkoxysilane; mercapto silane coupling agents such as 3-mercaptopropylmethyldimethoxysilane, and 3-mercaptopropyltrimethoxysilane; isocyanate silane coupling agents such as 3-isocyanatepropyltriethoxysilane; acid anhydride silane coupling agents such as 3-trimethoxysilylpropylsuccinic anhydride; and non-silane coupling-alkoxy silane compounds such as methyltrimethoxysilane, dimethyldimethoxysilane, phenyltrimethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, octyltriethoxysilane, decyltrimethoxysilane, 1,6-bis(trimethoxysilyl)hexane, and trifluoropropyltrimethoxysilane. These surface modifying agents may be used singly or as a combination of two or more of them with an arbitrary ratio.

Illustrative examples of the surface modifying agent that is commercially available include those manufactured by Shin-Etsu Chemical Co., Ltd., such as "KBM-1003" and "KBE-1003" (vinyl silane coupling agents); "KBM-303", "KBM-402", "KBM-403", "KBE-402", and "KBE-403" (epoxy silane coupling agents); "KBM-1403" (a styryl silane coupling agent); "KBM-502", "KBM-503", "KBE-502", and "KBE-503" (methacryl silane coupling agents); "KBM-5103" (an acryl silane coupling agent); "KBM-602", "KBM-603", "KBM-903", "KBE-903", "KBE-9103P", "KBM-573", and "KBM-575" (amino silane coupling agents); "KBM-9659" (an isocyanurate silane coupling agent); "KBE-585" (a ureido silane coupling agent); "KBM-802" and "KBM-803" (mercapto silane coupling agents); "KBE-9007N" (an isocyanate silane coupling agent); "X-12-967C" (an acid anhydride silane coupling agent); "KBM-13", "KBM-22", "KBM-103", "KBE-13", "KBE-22", "KBE-103", "KBM-3033", "KBE-3033", "KBM-3063", "KBE-3063", "KBE-3083", "KBM-3103C", "KBM-3066", and "KBM-7103" (non-silane coupling-alkoxy silane compounds).

In view of enhancement of the dispersion property of the inorganic filler, the degree of the surface modification by means of the surface modifying agent is preferably within a prescribed range. Specifically, 100% by mass of the inorganic filler is surface-modified with a surface modifying agent preferably in the range of 0.2 to 5% by mass, and more preferably in the range of 0.2 to 3% by mass, while still more preferably in the range of 0.3 to 2% by mass.

The degree of the surface modification by the surface modifying agent may be evaluated by the carbon amount per unit surface area of the inorganic filler. In view of enhancement of the dispersion property of the inorganic filler, the carbon amount per unit surface area of the inorganic filler is preferably 0.02 $mg/m^2$ or more, and more preferably 0.1 $mg/m^2$ or more, while still more preferably 0.2 $mg/m^2$ or more. On the other hand, in view of prevention of the increase in the melt viscosity of the resin composition and in the melt viscosity in the sheet form thereof, the carbon amount per unit surface area of the inorganic filler is preferably 1.0 $mg/m^2$ or less, and more preferably 0.8 $mg/m^2$ or less, while still more preferably 0.5 $mg/m^2$ or less.

The carbon amount per unit surface area of (D) the inorganic filler may be measured after the inorganic filler whose surface has been modified is cleaned by a solvent (for example, methyl ethyl ketone (MEK)). Specifically, a sufficient amount of MEK as the solvent is added to the inorganic filler whose surface has been modified with a surface modifying agent, and ultrasonic cleaning is carried out at 25° C. for 5 minutes. The supernatant solution thereof is removed; and then, after the solid component remained is dried, the carbon amount per unit surface area of the inorganic filler may be measured by using a carbon analysis apparatus. The carbon analysis apparatus such as "EMIR-320V" manufactured by Horiba Ltd., and the like may be used.

The content of (D) the inorganic filler in the resin composition is 60% by mass or more, and preferably 63% by mass or more, while more preferably 65% by mass or more, on the basis of 100% by mass of non-volatile components in the resin composition. The upper limit of the content of (D)

the inorganic filler is not particularly restricted, and it is preferably 98% by mass or less, and more preferably 95% by mass or less, while still more preferably 90% by mass or less, on the basis of 100% by mass of non-volatile components in the resin composition.

(E) Curing Agent

The resin composition according to the present invention includes (C) the nitrogen-containing novolak resin that can have a function as a curing agent to cure the epoxy resins including the (A) component and the (B) component. The resin composition can further include (E) a curing agent having a function to cure the epoxy resins as an arbitrary component other than the (C) component.

(E) The curing agent is not particularly restricted. Illustrative examples thereof include an acid anhydride type curing agent, an active ester type curing agent, a benzoxazine type curing agent, a cyanate ester type curing agent, and a carbodiimide type curing agent. The curing agent may be used singly or as a combination of two or more of these curing agents. It is preferable that (E) the curing agent include a curing agent selected from the active ester type curing agent and the carbodiimide type curing agent, while especially preferably the active ester type curing agent.

The acid anhydride type curing agent may be a curing agent having one or more acid anhydride groups in one molecule thereof, while a curing agent having two or more acid anhydride groups in one molecule thereof is preferable. Specific examples of the acid anhydride type curing agent include phthalic anhydride, tetrahydrophthalic anhydride, hexahydrophthalic anhydride, methyltetrahydrophthalic anhydride, methylhexahydrophthalic anhydride, methyl nadic anhydride, hydrogenated methyl nadic anhydride, trialkyl tetrahydrophthalic anhydride, dodecenyl succinic anhydride, 5-(2,5-dioxotetrahydro-3-furanyl)-3-methyl-3-cyclohexene-1,2-dicarboxylic anhydride, trimellitic anhydride, pyromellitic anhydride, benzophenonetetracarboxylic dianhydride, biphenyltetracarboxylic dianhydride, naphtalenetetracarboxylic dianhydride, oxydiphthalic dianhydride, 3,3'-4,4'-diphenylsulfonetetracarboxylic dianhydride, 1,3,3a,4,5,9b-hexahydro-5-(tetrahydro-2,5-dioxo-3-furanyl)-naphto[1,2-C]furan-1,3-dione, ethylene glycol bis(anhydrotrimellitate), and a polymer type acid anhydride such as styrene-maleic acid resin, which is a copolymer of styrene and maleic acid. Illustrative examples of the acid anhydride type curing agent that is commercially available include "HNA-100" and "MH-700" (manufactured by New Japan Chemical Co., Ltd.).

There is no particular restriction in the active ester type curing agent. In general, compounds having two or more ester groups having a high reactivity in one molecule can be preferably used, the ester groups such as a phenol ester, a thiophenol ester, an N-hydroxylamine ester, and an ester of a heterocyclic hydroxy compound. The active ester type curing agent is preferably a compound that is obtained by a condensation reaction of a carboxylic acid compound and/or a thiocarboxylic acid compound with a hydroxy compound and/or a thiol compound. In particular, in view of enhancement of a heat resistance, an active ester type curing agent obtained from a carboxylic acid compound and a hydroxy compound is preferable, while an active ester type curing agent obtained from a carboxylic acid compound and a phenol compound and/or a naphthol compound is more preferable. Illustrative examples of the carboxylic acid compound include benzoic acid, acetic acid, succinic acid, maleic acid, itaconic acid, phthalic acid, isophthalic acid, terephthalic acid, and pyromellitic acid. Illustrative examples of the phenol compound or the naphthol compound include hydroquinone, resorcin, bisphenol A, bisphenol F, bisphenol S, phenolphthalin, methylated bisphenol A, methylated bisphenol F, methylated bisphenol S, phenol, o-cresol, m-cresol, p-cresol, catechol, α-naphthol, β-naphthol, 1,5-dihydroxynaphthalene, 1,6-dihydroxynaphthalene, 2,6-dihydroxynaphthalene, dihydroxybenzophenone, trihydroxybenzophenone, tetrahydroxybenzophenone, phloroglucin, benzenetriol, a dicyclopentadiene type diphenol compound, and phenol novolak. Here, the "dicyclopentadiene type diphenol compound" means a diphenol compound obtained by condensation of one dicyclopentadiene molecule with two phenol molecules.

Specifically, preferable are an active ester compound containing a dicyclopentadiene type diphenol structure, an active ester compound containing a naphthalene structure, an active ester compound containing an acetylated phenol novolak, and an active ester compound containing a benzoylated phenol novolak. Among them, an active ester compound containing a naphthalene structure and an active ester compound containing a dicyclopentadiene type diphenol structure are more preferable. Here, the "dicyclopentadiene type diphenol structure" means a divalent structure unit formed of phenylene-dicyclopentalene-phenylene.

Illustrative examples of the active ester type curing agent that is commercially available include: as the active ester compounds containing a dicyclopentadiene type diphenol structure, "EXB-9451", "EXB-9460", "EXB-9460S", "HPC-8000", "HPC-8000H", "HPC-8000-65T", "HPC-8000H-65TM", "EXB-8000L", "EXB-8000L-65M", and "EXB-8000L-65TM" (these are manufactured by DIC Corp.); as the active ester compounds containing a naphthalene structure, "EXB-9416-70BK", "HPC-8150-60T", "HPC-8150-62T", "HPC-8100L-65T", and "EXB-8150L-65T" (these are manufactured by DIC Corp.); as the active ester type curing agent that is an acetylated phenol novolak, "DC808" (manufactured by Mitsubishi Chemical Corp.); and as the active ester type curing agent that is a benzoylated phenol novolak, "YLH1026" (manufactured by Mitsubishi Chemical Corp.), "YLH1030" (manufactured by Mitsubishi Chemical Corp.), and "YLH1048" (manufactured by Mitsubishi Chemical Corp.).

Specific examples of the benzoxazine type curing agent include "JBZ-OP100D" and "ODA-BOZ" (both are manufactured by JFE Chemical Corp.); "HFB2006M" (manufactured by Showa Highpolymer Co., Ltd.); and "P-d" and "F-a" (both are manufactured by Shikoku Chemicals Corp.).

Illustrative examples of the cyanate ester type curing agent include: bifunctional cyanate resins such as bisphenol A dicyanate, polyphenol cyanate(oligo(3-methylene-1,5-phenylenecyanate)), 4,4'-methylenebis(2,6-dimethylphenylcyanate), 4,4'-ethylidene diphenyl dicyanate, hexafluorobisphenol A dicyanate, 2,2-bis(4-cyanate)phenylpropane, 1,1-bis(4-cyanatephenylmethane), bis(4-cyanate-3,5-dimethylphenyl)methane, 1,3-bis(4-cyanatephenyl-1-(methylethylidene))benzene, bis(4-cyanatephenyl) thioether, and bis(4-cyanatephenyl) ether; polyfunctional cyanate resins derived from a phenol novolak, a cresol novolak, and the like; and a prepolymer in which these cyanate resins are partially made to triazine. Specific examples of the cyanate ester type curing agent include "PT30" and "PT60" (both are phenol novolak type polyfunctional cyanate ester resins); and "BA230" and "BA230S75" (both are prepolymers in which part or all of bisphenol A dicyanate is made to triazine so as to be a trimer); all of these agents being manufactured by Lonza Japan Ltd.

Specific examples of the carbodiimide type curing agent include "V-03" and "V-07" (both are manufactured by Nisshinbo Chemical, Inc.).

When the resin composition includes (E) the curing agent, a mass ratio of the epoxy resins including the (A) component and the (B) component to (E) the curing agent, the ratio of [number of the epoxy groups in the epoxy resins] to [number of the reactive groups in (E) the curing agent], is preferably 1:0.2 to 1:2, and more preferably 1:0.3 to 1:1.5, while still more preferably 1:0.4 to 1:1.2. Here, the reactive group of (E) the curing agent is different depending on the curing agent; for example, in the case of the active ester type curing agent, the reactive group is the active ester group.

The equivalent of the reactive group of (E) the curing agent is preferably in the range of 50 to 3,000 g/eq., more preferably in the range of 100 to 1,000 g/eq., and still more preferably in the range of 100 to 500 g/eq., while especially preferably in the range of 100 to 300 g/eq. The equivalent of the reactive group is the mass of the curing agent per 1 equivalent of the reactive group.

In the case that the active ester type curing agent is included in (E) the curing agent, the content thereof is not particularly restricted, and it is preferably 10% by mass or more, more preferably 20% by mass or more, and still more preferably 30% by mass or more, while especially preferably 40% by mass or more, on the basis of 100% by mass as the total mass of (E) the curing agent.

In the case that the resin composition includes (E) the curing agent, the content of (E) the curing agent in the resin composition is not particularly restricted, and it is preferably 0.01% by mass or more, more preferably 0.05% by mass or more, and still more preferably 0.1% by mass or more, while it can be especially preferably 0.5% by mass or more, on the basis of 100% by mass of non-volatile components in the resin composition. The upper limit of the content of (E) the curing agent is not particularly restricted, and it is preferably 50% by mass or less, more preferably 40% by mass or less, and still more preferably 30% by mass or less, while especially preferably 20% by mass or less, on the basis of 100% by mass of non-volatile components in the resin composition.

(F) Curing Accelerator

The resin composition according to the present invention may include, as an arbitrary component, (F) a curing accelerator. (F) The curing accelerator has a function to facilitate to cure the epoxy resins including the (A) component and the (B) component.

(F) The curing accelerator is not particularly restricted. Illustrative examples thereof include a phosphorous type curing accelerator, a urea type curing accelerator, an amine type curing accelerator, an imidazole type curing accelerator, a guanidine type curing accelerator, and a metal type curing accelerator. Among them, a phosphorous type curing accelerator, an amine type curing accelerator, an imidazole type curing accelerator, and a metal type curing accelerator are preferable, while an imidazole type curing accelerator is especially preferable. The curing accelerator may be used singly or as a mixture of two or more of these accelerators.

Illustrative examples of the phosphorous type curing accelerator include: aliphatic phosphonium salts such as tetrabutylphosphonium bromide, tetrabutylphosphonium chloride, tetrabutylphosphonium acetate, tetrabutylphosphonium decanoate, tetrabutylphosphonium laurate, bis(tetrabutylphosphonium) pyromellitate, tetrabutylphosphonium hydrogen hexahydrophthalate, tetrabutylphosphonium cresol novolak trimer salt, and di-tert-butylmethylphosphonium tetraphenylborate; aromatic phosphonium salts such as methyltriphenylphosphonium bromide, ethyltriphenylphosphonium bromide, propyltriphenylphosphonium bromide, butyltriphenylphosphonium bromide, benzyltriphenylphosphonium chloride, tetraphenylphosphonium bromide, p-tolyltriphenylphosphonium tetra-p-tolylborate, tetraphenylphosphonium tetraphenylborate, tetraphenylphosphonium tetra-p-tolylborate, triphenylethylphosphonium tetraphenylborate, tris(3-methylphenyl)ethylphosphonium tetraphenylborate, tris(2-methoxyphenyl)ethylphosphonium tetraphenylborate, (4-methylphenyl)triphenylphosphonium thiocyanate, tetraphenylphosphonium thiocyanate, and butyltriphenylphosphonium thiocyanate; aromatic phosphine-borane complexes such as triphenylphosphine-triphenylborane; aromatic phosphine-quinone addition reaction products such as a triphenylphosphine-p-benzoquinone addition reaction product; aliphatic phosphines such as tributylphosphine, tri-tert-butylphosphine, trioctylphosphine, di-tert-butyl(2-butenyl)phosphine, di-tert-butyl(3-methyl-2-butenyl)phosphine, and tricyclohexylphosphine; and aromatic phosphines such as dibutylphenylphosphine, di-tert-butylphenylphosphine, methyldiphenylphosphine, ethyldiphenylphosphine, butyldiphenylphosphine, diphenylcyclohexylphosphine, triphenylphosphine, tri-o-tolylphosphine, tri-m-tolylphosphine, tri-p-tolylphosphine, tris(4-ethylphenyl)phosphine, tris(4-propylphenyl)phosphine, tris(4-isopropylphenyl)phosphine, tris(4-butylphenyl)phosphine, tris(4-tert-butylphenyl)phosphine, tris(2,4-dimethylphenyl)phosphine, tris(2,5-dimethylphenyl)phosphine, tris(2,6-dimethylphenyl)phosphine, tris(3,5-dimethylphenyl)phosphine, tris(2,4,6-trimethylphenyl)phosphine, tris(2,6-dimethyl-4-ethoxyphenyl)phosphine, tris(2-methoxyphenyl)phosphine, tris(4-methoxyphenyl)phosphine, tris(4-ethoxyphenyl)phosphine, tris(4-tert-butoxyphenyl)phosphine, diphenyl-2-pyridylphosphine, 1,2-bis(diphenylphosphino)ethane, 1,3-bis(diphenylphosphino)propane, 1,4-bis(diphenylphosphino)butane, 1,2-bis(diphenylphosphino)acetylene, and 2,2'-bis(diphenylphosphino)diphenyl ether.

Illustrative examples of the urea type curing accelerator include: 1,1-dimethylurea; aliphatic dimethylureas such as 1,1,3-trimethylurea, 3-ethyl-1,1-dimethylurea, 3-cyclohexyl-1,1-dimethylurea, and 3-cyclooctyl-1,1-dimethylurea; and aromatic dimethylureas such as 3-phenyl-1,1-dimethylurea, 3-(4-chlorophenyl)-1,1-dimethylurea, 3-(3,4-dichlorophenyl)-1,1-dimethylurea, 3-(3-chloro-4-methylphenyl)-1,1-dimethylurea, 3-(2-methylphenyl)-1,1-dimethylurea, 3-(4-methylphenyl)-1,1-dimethylurea, 3-(3,4-dimethylphenyl)-1,1-dimethylurea, 3-(4-isopropylphenyl)-1,1-dimethylurea, 3-(4-methoxyphenyl)-1,1-dimethylurea, 3-(4-nitrophenyl)-1,1-dimethylurea, 3-[4-(4-methoxyphenoxy)phenyl]-1,1-dimethylurea, 3-[4-(4-chlorophenoxy)phenyl]-1,1-dimethylurea, 3-[3-(trifluoromethyl)phenyl]-1,1-dimethylurea, N,N-(1,4-phenylene) bis(N',N'-dimethylurea), and N,N-(4-methyl-1,3-phenylene) bis(N', N'-dimethylurea) [toluene bisdimethylurea].

Illustrative examples of the amine type curing accelerator include: trialkyl amines such as triethylamine, and tributylamine; and 4-dimethylaminopyridine (DMAP), benzyldimethylamine, 2,4,6-tris(dimethylaminomethyl)phenol, and 1,8-diazabicyclo (5,4,0)-undecene. Among them, 4-dimethylaminopyridine is preferable.

Illustrative examples of the imidazole type curing accelerator include imidazole compounds such as 2-methylimidazole, 2-undecylimidazole, 2-heptadecylimidazole, 1,2-dimethylimidazole, 2-ethyl-4-methylimidazole, 1,2-dimethylimidazole, 2-ethyl-4-methylimidazole, 2-phenylimidazole, 2-phenyl-4-methylimidazole, 1-bezyl-2- methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-metylimidazolyl-(1')]-ethyl-s-triazine, a 2,4-diamino-6-[2'-methylimidazolyl-(1')]-ethyl-s-triazine isocyanuric acid adduct, a 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrro[1,2-a]benzimidazole, 1-dodecyl-2-methyl-3-benzylimidazolium chloride, 2-methylimidazoline, and 2-phenylimidazoline; and adducts of these imidazole compounds with an epoxy resin.

Commercially available imidazole type curing accelerators may be used. Illustrative examples thereof include "P200-H50" manufactured by Mitsubishi Chemical Corp.

Illustrative examples of the guanidine type curing accelerator include dicyandiamide, 1-methylguanidine, 1-ethylguanidine, 1-cyclohexylguanidine, 1-phenylguanidine, 1-(o-tolyl)guanidine, dimethylguanidine, diphenylguanidine, trimethylguanidine, tetramethylguanidine, pentamethylguanidine, 1,5,7-triazabicyclo[4.4.0]deca-5-ene, 7-methyl-1,5,7-triazabicyclo[4.4.0]deca-5-ene, 1-methylbiguanide, 1-ethylbiguanide, 1-n-butylbiguanide, 1-n-octadecylbiguanide, 1,1-dimethylbiguanide, 1,1-diethylbiguanide, 1-cyclohexylbiguanide, 1-allylbiguanide, 1-phenylbiguanide, and 1-(o-tolyl)biguanide.

Illustrative examples of the metal type curing accelerator include organic metal complexes or organic metal salts of metals such as cobalt, copper, zinc, iron, nickel, manganese, and tin. Specific examples of the organic metal complex include organic cobalt complexes such as cobalt(II) acetylacetonate, and cobalt(III) acetylacetonate; organic copper complexes such as copper(II) acetylacetonate; organic zinc complexes such as zinc(II) acetylacetonate; organic iron complexes such as iron(III) acetylacetonate; organic nickel complexes such as nickel(II) acetylacetonate; and organic manganese complexes such as manganese(II) acetylacetonate. Illustrative examples of the organic metal salt include zinc octylate, tin octylate, zinc naphthenate, cobalt naphthenate, tin stearate, and zinc stearate.

In the case that the resin composition includes (F) the curing accelerator, the content of (F) the curing accelerator in the resin composition is not particularly restricted, and it is preferably 0.0001% by mass or more, more preferably 0.001% by mass or more, and still more preferably 0.005% by mass or more, while it can be especially preferably 0.01% by mass or more, on the basis of 100% by mass of non-volatile components in the resin composition. The upper limit of (F) the curing accelerator is not particularly restricted, and it is preferably 5% by mass or less, more preferably 1% by mass or less, and still more preferably 0.5% by mass or less, while especially preferably 0.2% by mass or less, on the basis of 100% by mass of non-volatile components in the resin composition.

(G) Other Additives

The resin composition according to the present invention may further include arbitrary additives as non-volatile components. Illustrative examples of the additive like this include: epoxy resins other than the (A) component and the (B) component; organic fillers such as rubber particles, polyamide particles, and silicone particles; thermoplastic resins such as a phenoxy resin, a polyvinyl acetal resin, a polysulfone resin, a polyether sulfone resin, a polyphenylene ether resin, a polycarbonate resin, a polyether ether ketone resin, and a polyester resin; organic metal compounds such as an organic copper compound, an organic zinc compound, and an organic cobalt compound; colorants such as phthalocyanine blue, phthalocyanine green, iodine green, diazo yellow, crystal violet, titanium oxide, and carbon black; polymerization inhibitors such as hydroquinone, catechol, pyrogallol, and phenothiazine; leveling agents such as a silicone type leveling agent, and an acrylic polymer type leveling agent; thickeners such as bentone, and montmorillonite; antifoaming agents such as a silicone type antifoaming agent, an acrylic antifoaming agent, a fluorine type antifoaming agent, and a vinyl resin type antifoaming agent; UV absorbers such as a benzotriazole type UV absorber; adhesion enhancers such as a urea silane; adhesion assisting agents such as a triazole type adhesion assisting agent, a tetrazole type adhesion assisting agent, and a triazine type adhesion assisting agent; antioxidants such as a hindered phenol type antioxidant, and a hindered amine type antioxidant; fluorescent whitening agents such as a stilbene derivative; surfactants such as a fluorine type surfactant, and a silicone type surfactant; and flame retardants such as phosphorous type flame retardants (for example, phosphate ester compounds, phosphazene compounds, phosphine acid compounds, and red phosphorous), nitrogen type flame retardants (for example, melamine sulfate), halogen type flame retardants, and inorganic flame retardants (for example, antimony trioxide). These additives may be used singly or as a combination of two or more of them with an arbitrary ratio. The contents of (G) the other additives may be readily determined by a person ordinarily skilled in the art.

(H) Organic Solvent

The resin composition according to the present invention may further include, in addition to the non-volatile components described above, an arbitrary organic solvent as a volatile component. Heretofore known solvents may be arbitrarily used as (H) the organic solvent without any particular restriction. Illustrative examples of (H) the organic solvent include: ketone type solvents such as acetone, methyl ethyl ketone, methyl isobutyl ketone, and cyclohexanone; ester type solvents such as methyl acetate, ethyl acetate, butyl acetate, isobutyl acetate, isoamyl acetate, methyl propionate, ethyl propionate, and y-butyrolactone; ether type solvents such as tetrahydropyran, tetrahydrofuran, 1,4-dioxane, diethyl ether, diisopropyl ether, dibutyl ether, and diphenyl ether; alcohol type solvents such as methanol, ethanol, propanol, butanol, and ethylene glycol; ether ester type solvents such as 2-ethoxyethyl acetate, propylene glycol monomethyl ether acetate, diethylene glycol monoethyl ether acetate, ethyl diglycol acetate, y-butyrolactone, and methyl methoxypropionate; ester alcohol type solvents such as methyl lactate, ethyl lactate, and methyl 2-hydroxyisobutyrate; ether alcohol type solvents such as 2-methoxypropanol, 2-methoxyethanol, 2-ethoxyethanol, propylene glycol monomethyl ether, and diethylene glycol monobutyl ether (butyl carbitol); amide type solvents such as N,N-dimethylformamide, N,N-dimethylacetamide, and N-methyl-2-pyrrolidone; sulfoxide type solvents such as dimethyl sulfoxide; nitrile type solvents such as acetonitrile, and propionitrile; aliphatic hydrocarbon type solvents such as hexane, cyclopentane, cyclohexane, and methylcyclohexane; and aromatic hydrocarbon type solvents such as benzene, toluene, xylene, ethylbenzene, and trimethylbenzene. (H) The organic solvents may be used singly or as a combination of two or more of them with an arbitrary ratio.

Production Method of the Resin Composition

The resin composition according to the present invention may be produced, for example, by adding and mixing, in an arbitrary reacting vessel, (A) the polyolefin epoxy resin, (B) the epoxy resin having the condensed polycyclic aromatic hydrocarbon, (C) the nitrogen-containing novolak resin, (D) the inorganic filler, as necessary (E) the curing agent, as necessary (F) the curing accelerator, as necessary (G) other additives, and as necessary (H) the organic solvent, in an arbitrary order and/or partially or all at once. During the addition and mixing process of these components, the temperature may be arbitrarily set; and temporarily or entirely in this process, they may be heated and/or cooled. During the addition and mixing process of these components, they may be stirred or shaken. During the addition and mixing process, or after this process, the resin composition may be stirred by using a stirring apparatus such as, for example, a mixer so as to uniformly disperse the composition.

Characteristics of the Resin Composition

The resin composition according to the present invention includes (A) the polyolefin epoxy resin having an epoxy equivalent of 200 g/eq. or more, (B) the epoxy resin having the condensed polycyclic aromatic hydrocarbon, (C) the nitrogen-containing novolak resin having a nitrogen content of 13% by mass or more and/or having the cresol novolak structure, and (D) the inorganic filler with a content of 60% by mass or more; and thus, a cured product having a suppressed warp as well as a superior crack resistance can be obtained.

In the cured product of the resin composition according to the present invention, a warp thereof is suppressed; and thus, when a sample prepared in accordance with Test Example 1 to be described later is measured with fixing a long side thereof, a warp amount in the direction of a short side thereof can be less than 10 μm.

The cured product of the resin composition according to the present invention has a superior crack resistance; and thus, when a circuit board prepared and roughened in accordance with Test Example 2 to be described later is observed, the number of cracks in 100 copper pad portions of the circuit board can be preferably 10 or less.

Use of the Resin Composition

The resin composition according to the present invention can be suitably used as a resin composition for an insulation use, especially as a resin composition to form an insulating layer. Specifically, the resin composition according to the present invention can be suitably used as a resin composition to form an insulating layer on which a conductive layer (including a rewiring layer) is to be formed (resin composition for forming of an insulating layer to form a conductive layer). In addition, the resin composition according to the present invention can be suitably used as a resin composition to form an insulating layer of a printed wiring board to be described later (resin composition for forming of an insulating layer of a printed wiring board). In addition, the resin composition according to the present invention can be widely used in the use fields requiring a resin composition, such fields as a resin sheet, a sheet-like laminate material such as a prepreg, a solder resist, an under-filler, a die bonding material, a semiconductor sealing material, a hole-filling resin, and a component-burying resin.

For example, in the case that a semiconductor chip package is produced by way of the following processes (1) to (6), the resin composition according to the present invention can also be suitably used as a resin composition for forming of a rewiring forming layer, for forming of an insulating layer to form the rewiring layer (resin composition for forming of a rewiring forming layer), and for sealing of a semiconductor chip (resin composition for sealing of a semiconductor chip). When a semiconductor chip package is produced, a rewiring layer may be further formed on a sealing layer.

(1) Process to laminate a temporarily fixed film on a substrate, (2) process to temporarily fix a semiconductor chip onto the temporarily fixed film, (3) process to form a sealing layer on the semiconductor chip, (4) process to remove the substrate and the temporarily fixed film from the semiconductor chip, (5) process to form a rewiring forming layer as an insulating layer on surface from which the substrate of the semiconductor chip and the temporarily fixed film have been removed, and (6) process to form a rewiring layer as a conductive layer on the rewiring forming layer.

The resin composition according to the present invention can form an insulating layer that is superior in the component-burying property, so that the resin composition according to the present invention can be suitably used also in the case where a printed wiring board is a component-incorporated circuit board.

Sheet-Like Laminate Material

The resin composition according to the present invention may also be used in a varnish state so as to be applied, and industrially in general, it is preferable to use this in the form of a sheet-like laminate material containing the resin composition.

The sheet-like laminate material is preferably a resin sheet and a prepreg as described below.

In one embodiment, the resin sheet is formed of a support and a resin composition layer formed on the support, in which the resin composition layer is formed of the resin composition according to the present invention.

In view of the thinning of a printed wiring board, and also in order to provide a cured product having a superior insulating property even if the cured product of this resin composition is a thin film, the thickness of the resin composition layer is preferably 50 μm or less, while more preferably 40 μm or less. The lower limit of the thickness of the resin composition layer is not particularly restricted, and it can be usually made 5 μm or more, 10 μm or more, or the like.

Illustrative examples of the support include a film formed of a plastic material, metal foil, and a releasing paper. Among them, a film formed of a plastic material and metal foil are preferable.

In the case that the film formed of a plastic material is used as the support, illustrative examples of the plastic material include polyesters such as polyethylene terephthalate (hereinafter, this may be simply called "PET"), and polyethylene naphthalate (hereinafter, this may be simply called "PEN"); polycarbonate (hereinafter, this may be simply called "PC"); acryls such as polymethyl methacrylate (PMMA); a cyclic polyolefin; triacetyl cellulose (TAC); polyether sulfide (PES); polyether ketone; and polyimide. Among them, polyethylene terephthalate and polyethylene naphthalate are preferable, while inexpensive polyethylene terephthalate is especially preferable.

In the case that metal foil is used as the support, illustrative examples of the metal foil include copper foil and aluminum foil, and copper foil is preferable. As to the copper foil, the foil formed of a copper single metal or an alloy of copper with other metal (for example, tin, chromium, silver, magnesium, nickel, zirconium, silicon, titanium, and the like) may be used.

The support may be subjected to a mat treatment, a corona treatment, or an antistatic treatment on the surface to be bonded with the resin composition layer.

As to the support, a releasing layer-attached support having a releasing layer on the surface to be bonded with the resin composition layer may be used. The releasing agent to be used in the releasing layer of the releasing layer-attached support may be one or more releasing agents selected from the group consisting of, for example, an alkyd resin, a polyolefin resin, a urethane resin, and a silicone resin. A commercially available releasing layer-attached support may also be used. Illustrative examples thereof include a PET film having a releasing layer mainly formed of an alkyd resin type releasing agent, such as "SK-1", "AL-5", and "AL-7" (these are manufactured by Lintech Corp.); "Lumirror T60" (manufactured by Toray Industries); "Purex" (manufactured by Teijin Ltd.); and "Unipeel" (manufactured by Unitika Ltd.).

The thickness of the support is not particularly restricted, and it is preferably in the range of 5 to 75 µm, while more preferably in the range of 10 to 60 µm. When the releasing layer-attached support is used, total thickness of the releasing layer-attached support is preferably within this range.

In one embodiment, the resin sheet may further include an arbitrary layer, if necessary. The arbitrary layer may include, for example, a protection film, which is similar to the support, formed on the surface of the resin composition layer not bonded with the support (namely, the surface opposite to the support). The thickness of the protection film is not particularly restricted, and it is, for example, in the range of 1 to 40 µm. By providing the protection film, the resin composition layer may be prevented from attachment of dirt and the like as well as from a scar on the surface thereof.

The resin sheet may be produced, for example, as follows. The resin composition in a liquid state as it is, or a resin varnish prepared by dissolving the resin composition into an organic solvent is applied onto a support by means of a die coater or the like; and then, dried to form the resin composition layer.

Organic solvents the same as those explained as the component in the resin composition may be used. These organic solvents may be used singly or as a combination of two or more of them.

Drying may be carried out by a heretofore known method such as heating, and blowing of a hot air. The drying condition is not particularly restricted. Drying is carried out so as to bring the content of the organic solvent in the resin composition layer to 10% by mass or less, while preferably to 5% by mass or less. In the case that the resin composition containing an organic solvent with the amount, for example, in the range of 30 to 60% by mass, or the resin varnish containing an organic solvent with the same amount is used, the resin composition layer may be formed by drying thereof at 50 to 150° C. for 3 to 10 minutes, although these conditions are different depending on the boiling point of the organic solvent contained in the resin composition or in the resin varnish.

The resin sheet can be rolled up so as to be stored. In the case that the resin sheet has the protection film, the resin sheet can be used after the protection film is removed.

In one embodiment, a prepreg is formed by impregnating a sheet-like fibrous substrate with the resin composition according to the present invention.

The sheet-like fibrous substrate to be used in the prepreg is not particularly restricted. Those usually used as the substrate for a prepreg, such as a glass cloth, an aramid unwoven cloth, and a liquid crystal polymer unwoven cloth, may be used. In view of the thinning of a printed wiring board, the thickness of the sheet-like fibrous substrate is preferably 50 µm or less, more preferably 40 µm or less, and still more preferably 30 µm or less, while especially preferably 20 µm or less. The lower limit of the thickness of the sheet-like fibrous substrate is not particularly restricted. Usually, the thickness thereof is 10 µm or more.

The prepreg may be produced by a heretofore known method such as a hot melt method, and a solvent method.

The thickness of the prepreg may be made within the same range as that of the resin composition layer in the resin sheet.

The sheet-like laminate material according to the present invention may be preferably used to form an insulating layer in a printed wiring board (material for an insulating layer in a printed wiring board), while more preferably to form an interlayer insulating layer in a printed wiring board (material for an interlayer insulating layer in a printed wiring board).

Printed Wiring Board

The printed wiring board according to the present invention includes an insulating layer formed of a cured product obtained by curing the resin composition according to the present invention.

The printed wiring board may be produced, for example, by using the resin sheet described above by a method including following processes (I) and (II):

(I) process to laminate a resin sheet on an inner layer substrate so as to bond a resin composition layer of the resin sheet with the inner layer substrate, and (II) process to cure the resin composition layer (for example, thermal cure) thereby forming an insulating layer.

The "inner layer substrate" used in the process (I) is a component to become a substrate of a printed wiring board; and illustrative examples thereof include a glass epoxy substrate, a metal substrate, a polyester substrate, a polyimide substrate, a BT resin substrate, and a thermosetting polyphenylene ether substrate. This substrate may have a conductive layer on one side or both sides thereof; and this conductive layer may be pattern-processed. The inner layer substrate having a conductive layer (circuit) on one side or both sides of the substrate may be called "inner layer circuit substrate". An intermediate product with which an insulating layer and/or a conductive layer is to be formed at the time of producing a printed wiring board is also included in the "inner layer substrate" according to the present invention. In the case that the printed wiring board is a component-incorporated circuit board, an inner substrate incorporated with the component may be used.

Lamination of the resin sheet to the inner layer substrate may be carried out, for example, by hot-press adhesion of the resin sheet to the inner layer substrate from the support side thereof. Illustrative examples of the component for hot-press adhesion of the resin sheet to the inner layer substrate (hereinafter, this component is also called "hot-pressing component") include a heated metal plate (SUS mirror plate and the like) and a heated metal roll (SUS roll). It is preferable that the resin sheet is not pressed directly against the hot-pressing component, but via an elastic material such as a heat-resistant rubber so that the resin sheet can sufficiently follow the surface irregularity of the inner layer substrate.

Lamination of the resin sheet to the inner layer substrate may be carried out by a vacuum lamination method. In the vacuum lamination method, the temperature of the hot-press adhesion is preferably in the range of 60 to 160° C., while more preferably in the range of 80 to 140° C. The pressure of the hot-press adhesion is preferably in the range of 0.098 to 1.77 MPa, while more preferably in the range of 0.29 to 1.47 MPa. The period of the hot-press adhesion is preferably in the range of 20 to 400 seconds, while more preferably in the range of 30 to 300 seconds. The lamination can be carried out under evacuated condition of preferably 26.7 hPa or less of the pressure.

Lamination may be carried out by using a commercially available vacuum laminator. Illustrative examples of the commercially available vacuum laminator include a vacuum pressure type laminator manufactured by Meiki Co., Ltd., and a vacuum applicator and a batch type vacuum pressure laminator, both being manufactured by Nikko-Materials Co., Ltd.

After the lamination, for example, the laminated resin sheet may be flattened by pressing the hot-pressing component from the side of the support thereof under a normal pressure (under an atmospheric pressure). The pressing conditions of the flattening process can be made as same as the hot-press adhering conditions in the before-mentioned lamination. The flattening process may be carried out by using a commercially available laminator. The lamination and the flattening processes may be carried out continuously by using the commercially available vacuum laminator described above.

The support may be removed between the process (I) and the process (II), or after the process (II).

In the process (II), the resin composition layer is cured (for example, thermally cured) to form an insulating layer formed of a cured product of the resin composition. Curing conditions of the resin composition layer are not particularly restricted, so that the conditions usually used to form an insulating layer of a printed wiring board may be used.

Thermosetting conditions of the resin composition layer are different depending on the resin composition and the like. For example, the curing temperature is preferably in the range of 120 to 240° C., and more preferably in the range of 150 to 220° C., while still more preferably in the range of 170 to 210° C. The curing period can be made preferably in the range of 5 to 120 minutes, and more preferably in the range of 10 to 100 minutes, while still more preferably in the range of 15 to 100 minutes.

Before the resin composition layer is thermally cured, the resin composition layer may be pre-heated at the temperature lower than the curing temperature. For example, prior to the thermal curing of the resin composition layer, the resin composition layer may be pre-heated in the temperature range of 50 to 120° C., and preferably in the range of 60 to 115° C., while more preferably in the range of 70 to 110° C., and for the period of 5 minutes or longer, preferably in the range of 5 to 150 minutes, and more preferably in the range of 15 to 120 minutes, while still more preferably in the range of 15 to 100 minutes.

In production of the printed wiring board, a process (III) to make a hole in the insulating layer, a process (IV) to roughen the insulating layer, and a process (V) to form a conductive layer may be further carried out. The processes from (III) to (V) may be carried out in accordance with various methods heretofore known to a person ordinarily skilled in the art in production of a printed wiring board. In the case that the support is removed after the process (II), removal of the support may be carried out between the process (II) and the process (III), or between the process (III) and the process (IV), or between the process (IV) and the process (V). As needed, processes (II) to (V), i.e., formation of the insulating layer and the conductive layer, may be repeated to form a multilayer wiring board.

In other embodiment, the printed wiring board according to the present invention may be produced by using the above-mentioned prepreg. Production method thereof is basically the same as the production method of the resin sheet.

In the process (III), a hole is made in the insulating layer. With this process, a hole such as a via hole, and a through hole can be formed in the insulating layer. The process (III) may be carried out by using, for example, a drill, a laser, a plasma, or the like in accordance with composition and the like of the resin composition used to form the insulating layer. The size and shape of the hole may be arbitrarily determined in accordance with a design of the printed wiring board.

In the process (IV), the insulating layer is roughened. Usually, in the process (IV), a smear is removed as well. The procedure and condition of the roughening process are not particularly restricted, so that heretofore known procedure and condition usually used to form an insulating layer of a printed wiring board may be used. The roughening process of the insulating layer may be carried out, for example, by a method in which a swelling treatment with a swelling liquid, a roughening treatment with an oxidant, and a neutralizing treatment with a neutralizing solution are carried out in this order.

The swelling liquid to be used in the roughening process is not particularly restricted, and illustrative examples thereof include an alkaline solution and a surfactant solution. Among them, an alkaline solution is preferable, while a sodium hydroxide solution and a potassium hydroxide solution are more preferable as the alkaline solution. Illustrative examples of the swelling liquid that is commercially available include "Swelling Dip Securiganth P" and "Swelling Dip Securiganth SBU" (both are manufactured by Atotech Japan Co., Ltd.). The swelling treatment with the swelling liquid is not particularly restricted, and for example, the swelling treatment can be carried out by soaking the insulating layer into the swelling liquid in the temperature range of 30 to 90° C. for the period of 1 to 20 minutes. In view of suppressing the swelling of the resin in the insulating layer to a suitable level, it is preferable to soak the insulating layer into the swelling liquid in the temperature range of 40 to 80° C. for the period of 5 to 15 minutes.

Oxidant to be used in the roughening process is not particularly restricted, and illustrative examples thereof include an alkaline permanganate solution having potassium permanganate or sodium permanganate dissolved into a sodium hydroxide aqueous solution. The roughening process with an oxidant such as the alkaline permanganate solution may be carried out preferably by soaking the insulating layer into the oxidant solution heated to 60 to 100° C. for the period of 10 to 30 minutes. The concentration of the permanganate salt in the alkaline permanganate solution is preferably in the range of 5 to 10% by mass. Illustrative examples of the oxidant that is commercially available include alkaline permanganate solutions such as "Concentrate Compact CP" and "Dosing Solution Securiganth P", both being manufactured by Atotech Japan, Co., Ltd.

The neutralization solution to be used in the roughening process is preferably an acidic aqueous solution, and illustrative examples that are commercially available include "Reduction Solution Securiganth P" (manufactured by Atotech Japan Co., Ltd.).

Treatment with the neutralization solution can be carried out by soaking the surface treated with the roughening process by using the oxidant into the neutralization solution in the temperature range of 30 to 80° C. for the period of 5 to 30 minutes. In view of workability, it is preferable to soak the object treated with the roughening process by using the oxidant into the neutralization solution in the temperature range of 40 to 70° C. for the period of 5 to 20 minutes.

In one embodiment, the arithmetic average roughness (Ra) of the surface of the insulating layer after the roughening process is not particularly restricted, and it is preferably 500 nm or less, and more preferably 400 nm or less, while still more preferably 300 nm or less. The lower limit thereof is not particularly restricted, and it can be, for example, 1 nm or more, 2 nm or more, or the like. The root mean square roughness (Rq) of the surface of the insulating layer after the roughening process is preferably 500 nm or less, and more preferably 400 nm or less, while still more preferably 300 nm or less. The lower limit thereof is not particularly restricted; it can be made, for example, 1 nm or more, 2 nm or more, or the like. The arithmetic average roughness (Ra) and the root mean square roughness (Rq) of the surface of the insulating layer can be measured by using a non-contact type surface roughness meter.

In the process (V), a conductive layer is formed; the conductive layer is formed on the insulating layer. There is no particular restriction in the conductive material to be used in the conductive layer. In a preferred embodiment, the conductive layer includes one or more metals selected from the group consisting of gold, platinum, palladium, silver, copper, aluminum, cobalt, chromium, zinc, nickel, titanium, tungsten, iron, tin, and indium. The conductive layer may be a single metal layer or a metal alloy layer. Illustrative examples of the metal alloy layer include layers formed of metal alloys of two or more metals selected from the group mentioned above (for example, nickel-chromium alloy, copper-nickel alloy, and copper-titanium alloy). Among them, in view of general applicability to formation of the conductive layer, cost, easy patterning, and the like, preferable are single metal layers of chromium, nickel, titanium, aluminum, zinc, gold, palladium, silver, or copper; and metal alloy layers of a nickel-chromium alloy, a copper-nickel alloy, and a copper-titanium alloy. Among them, more preferable are single metal layers of chromium, nickel, titanium, aluminum, zinc, gold, palladium, silver, or copper, or a metal alloy layer of a nickel-chromium alloy. A single metal layer of copper is still more preferable.

The conductive layer may be of a single layer structure or of a multiple layer structure that includes two or more laminated single metal layers or metal alloy layers formed of different metals or metal alloys. In the case that the conductive layer is of the multiple layer structure, the layer contacting with the insulating layer is preferably a single metal layer of chromium, zinc, or titanium, or a metal alloy layer of a nickel-chromium alloy.

The thickness of the conductive layer is generally in the range of 3 to 35 μm, while preferably in the range of 5 to 30 μm, although these values are dependent on the intended design of the printed wiring board.

In one embodiment, the conductive layer may be formed by plating. For example, the conductive layer having an intended wiring pattern may be formed by plating on the surface of the insulating layer by a conventional heretofore known technology such as a semi-additive method, and a full additive method. In view of convenience in the production thereof, it is preferable to form the conductive layer by a semi-additive method. Hereinafter, an example will be described in which the conductive layer is formed by a semi-additive method.

First, a plated seed layer is formed onto the surface of the insulating layer by electroless plating. Next, onto the plated seed layer thus formed, a mask pattern is formed so as to expose part of the plated seed layer in accordance with an intended wiring pattern. After a metal layer is formed by electroplating onto the plated seed layer thus exposed, the mask pattern is removed. Thereafter, an unnecessary plated seed layer is removed by etching or the like, so that the conductive layer having the intended wiring pattern can be formed.

In an alternative embodiment, the conductive layer may be formed by using metal foil. In the case that the conductive layer is formed by using metal foil, it is preferable to carry out the process (V) between the process (I) and the process (II). For example, after the process (I), the support is removed; and the metal foil is laminated on the surface of the resin composition layer thus exposed. Lamination of the metal foil with the resin composition layer may be carried out by a vacuum lamination method. The lamination conditions may be the same as those explained in the process (I). Next, the process (II) is carried out to form the insulating layer. Thereafter, by utilizing the metal foil on the insulating layer, the conductive layer having an intended wiring pattern can be formed by a conventional heretofore known technology such as a subtractive method, and a modified semi-additive method, or the like.

The metal foil may be produced by a heretofore known method such as an electrolysis method, and a rolling method. Illustrative examples of the metal foil that is commercially available include: HLP foil and JXUT-III foil (both are manufactured by JX Nippon Mining & Metals Corp.); and 3EC-III foil and TP-III foil (both are manufactured by Mitsui Mining & Smelting Co., Ltd.).

Semiconductor Device

The semiconductor device according to the present invention includes the printed wiring board according to the present invention. The semiconductor device according to the present invention can be produced by using the printed wiring board according to the present invention.

The semiconductor device may be various semiconductor devices to be supplied to electric products (for example, computers, mobile phones, digital cameras, and televisions), vehicles (for example, motor bikes, automobiles, electric trains, marine ships, and airplanes), and the like.

EXAMPLES

Hereinafter, the present invention will be explained specifically by means of Examples. It must be noted here that the present invention is not limited to these Examples. In the explanation below, "parts" and "%" that are used to express quantities mean "parts by mass" and "% by mass" unless otherwise specifically mentioned.

Example 1

Into 5 parts of MEK, 1 part of a polybutadiene epoxy resin ("JP-100": manufactured by Nippon Soda Co., Ltd.; epoxy equivalent of about 210 g/eq.) and 3.5 parts of an epoxy resin having a naphthalene skeleton ("HP-4032-SS": manufactured by DIC Corp.; epoxy equivalent of about 144 g/eq.) were dissolved. To this solution, 35 parts of spherical silica ("SO-C2": manufactured by Admatechs Co., Ltd.; average particle diameter of 0.77 μm) surface-modified with an amino silane coupling agent ("KBM-573": manufactured by Shin-Etsu Chemical Co., Ltd.), 11 parts of an active ester type curing agent ("HPC-8150-60T": manufactured by DIC Corp.; a toluene solution with a solid portion of 60% by mass), 1 part of a triazine-containing cresol novolak resin ("LA-3018-50P": manufactured by DIC Corp.; a nitrogen content of 18%; a propylene glycol monomethyl ether solution with a solid portion of 50% by mass), 0.5 part of a carbodiimide type curing agent ("V03": manufactured by Nisshinbo Chemical, Inc.; a toluene solution with a solid portion of 50% by mass), and 0.01 part of an imidazole compound ("1B2PZ": manufactured by Shikoku Chemicals Corp.) were added; and then, a resulting mixture was uniformly dispersed by means of a high speed rotation mixer to obtain a resin composition.

Example 2

A resin composition was prepared by the same way as Example 1 except that 1 part of a polybutadiene epoxy resin ("JP-200": manufactured by Nippon Soda Co., Ltd.; epoxy equivalent of about 225 g/eq.) was used in place of 1 part of the polybutadiene epoxy resin ("JP-100": manufactured by Nippon Soda Co., Ltd.; epoxy equivalent of about 210 g/eq.).

Example 3

A resin composition was prepared by the same way as Example 1 except that 1 part of a polybutadiene epoxy resin ("JP-400": manufactured by Nippon Soda Co., Ltd.; epoxy equivalent of about 230 g/eq.) was used in place of 1 part of the polybutadiene epoxy resin ("JP-100": manufactured by Nippon Soda Co., Ltd.; epoxy equivalent of about 210 g/eq.).

Example 4

Into 4 parts of MEK, 1 part of a polybutadiene epoxy resin ("JP-100": manufactured by Nippon Soda Co., Ltd.; epoxy equivalent of about 210 g/eq.) and 3.5 parts of an epoxy resin having a naphthalene skeleton ("ESN-475V": manufactured by Nippon Steel Chemical & Material Co., Ltd.; epoxy equivalent of about 332 g/eq.) were dissolved. To this solution, 25 parts of spherical silica ("SO-C2": manufactured by Admatechs Co., Ltd.; average particle diameter of 0.77 µm) surface-modified with an amino silane coupling agent ("KBM-573": manufactured by Shin-Etsu Chemical Co., Ltd.), 6 parts of an active ester type curing agent ("HPC-8150-60T": manufactured by DIC Corp.; a toluene solution with a solid portion of 60% by mass), 0.5 part of a triazine-containing cresol novolak resin ("LA-3018-50P": manufactured by DIC Corp.; a nitrogen content of 18%; a propylene glycol monomethyl ether solution with a solid portion of 50% by mass), 0.5 part of a carbodiimide type curing agent ("V03": manufactured by Nisshinbo Chemical, Inc.; a toluene solution with a solid portion of 50% by mass), and 0.01 part of an imidazole compound ("1B2PZ": manufactured by Shikoku Chemicals Corp.) were added; and then, a resulting mixture was uniformly dispersed by means of a high speed rotation mixer to obtain a resin composition.

Example 5

Into 5 parts of MEK, 1 part of a polybutadiene epoxy resin ("JP-100": manufactured by Nippon Soda Co., Ltd.; epoxy equivalent of about 210 g/eq.) and 3.5 parts of an epoxy resin having a naphthalene skeleton ("HP-6000-L": manufactured by DIC Corp.; epoxy equivalent of about 213 g/eq.) were dissolved. To this solution, 30 parts of spherical silica ("SO-C2": manufactured by Admatechs Co., Ltd.; average particle diameter of 0.77 µm) surface-modified with an amino silane coupling agent ("KBM-573": manufactured by Shin-Etsu Chemical Co., Ltd.), 9 parts of an active ester type curing agent ("HPC-8150-60T": manufactured by DIC Corp.; a toluene solution with a solid portion of 60% by mass), 0.5 part of a triazine-containing cresol novolak resin ("LA-3018-50P": manufactured by DIC Corp.; a nitrogen content of 18%; a propylene glycol monomethyl ether solution with a solid portion of 50% by mass), 0.5 part of a carbodiimide type curing agent ("V03": manufactured by Nisshinbo Chemical, Inc.; a toluene solution with a solid portion of 50% by mass), and 0.01 part of an imidazole compound ("1B2PZ": manufactured by Shikoku Chemicals Corp.) were added; and then, a resulting mixture was uniformly dispersed by means of a high speed rotation mixer to obtain a resin composition.

Example 6

Into 5 parts of MEK, 1 part of a polybutadiene epoxy resin ("JP-100": manufactured by Nippon Soda Co., Ltd.; epoxy equivalent of about 210 g/eq.) and 3.5 parts of an epoxy resin having a naphthalene skeleton ("EXA-7311-G4S": manufactured by DIC Corp.; epoxy equivalent of about 187 g/eq.) were dissolved. To this solution, 31 parts of spherical silica ("SO-C2": manufactured by Admatechs Co., Ltd.; average particle diameter of 0.77 µm) surface-modified with an amino silane coupling agent ("KBM-573": manufactured by Shin-Etsu Chemical Co., Ltd.), 9.5 parts of an active ester type curing agent ("HPC-8150-60T": manufactured by DIC Corp.; a toluene solution with a solid portion of 60% by mass), 0.5 part of a triazine-containing cresol novolak resin ("LA-3018-50P": manufactured by DIC Corp.; a nitrogen content of 18%; a propylene glycol monomethyl ether solution with a solid portion of 50% by mass), 0.5 part of a carbodiimide type curing agent ("V03": manufactured by Nisshinbo Chemical, Inc.; a toluene solution with a solid portion of 50% by mass), and 0.01 part of an imidazole compound ("1B2PZ": manufactured by Shikoku Chemicals Corp.) were added; and then, a resulting mixture was uniformly dispersed by means of a high speed rotation mixer to obtain a resin composition.

Example 7

A resin composition was prepared by the same way as Example 1 except that 10.5 parts of an active ester type curing agent ("HPC-8000-65T": manufactured by DIC Corp.; a toluene solution with a solid portion of 65% by mass) was used in place of 11 parts of the active ester type curing agent ("HPC-8150-60T": manufactured by DIC Corp.; a toluene solution with a solid portion of 60% by mass).

Example 8

Into 5 parts of MEK, 1 part of a polybutadiene epoxy resin ("JP-100": manufactured by Nippon Soda Co., Ltd.; epoxy equivalent of about 210 g/eq.) and 3.5 parts of an epoxy resin having a naphthalene skeleton ("HP-4032-SS": manufactured by DIC Corp.; epoxy equivalent of about 144 g/eq.) were dissolved. To this solution, 21 parts of spherical silica ("SO-C2": manufactured by Admatechs Co., Ltd.; average particle diameter of 0.77 μm) surface-modified with an amino silane coupling agent ("KBM-573": manufactured by Shin-Etsu Chemical Co., Ltd.), 5 parts of a triazine-containing cresol novolak resin ("LA-3018-50P": manufactured by DIC Corp.; a nitrogen content of 18%; a propylene glycol monomethyl ether solution with a solid portion of 50% by mass), 0.5 part of a carbodiimide type curing agent ("V03": manufactured by Nisshinbo Chemical, Inc.; a toluene solution with a solid portion of 50% by mass), and 0.01 part of an imidazole compound ("1B2PZ": manufactured by Shikoku Chemicals Corp.) were added; and then, a resulting mixture was uniformly dispersed by means of a high speed rotation mixer to obtain a resin composition.

Comparative Example 1

A resin composition was prepared by the same way as Example 1 except that 1 part of a polybutadiene epoxy resin ("PB3600": manufactured by Daicel Corp.; epoxy equivalent of about 193 g/eq.) was used in place of 1 part of the polybutadiene epoxy resin ("JP-100": manufactured by Nippon Soda Co., Ltd.; epoxy equivalent of about 210 g/eq.).

Comparative Example 2

Into 5 parts of MEK, 1 part of a polybutadiene epoxy resin ("JP-100": manufactured by Nippon Soda Co., Ltd.; epoxy equivalent of about 210 g/eq.) and 3.5 parts of an epoxy resin having a naphthalene skeleton ("HP-4032-SS": manufactured by DIC Corp.; epoxy equivalent of about 144 g/eq.) were dissolved. To this solution, 33 parts of spherical silica ("SO-C2": manufactured by Admatechs Co., Ltd.; average particle diameter of 0.77 μm) surface-modified with an amino silane coupling agent ("KBM-573": manufactured by Shin-Etsu Chemical Co., Ltd.), 10 parts of an active ester type curing agent ("HPC-8150-60T": manufactured by DIC Corp.; a toluene solution with a solid portion of 60% by mass), 1 part of a triazine-containing phenol novolak resin ("LA-7054": manufactured by DIC Corp.; a nitrogen content of 12%; a methyl ethyl ketone solution with a solid portion of 60% by mass), 0.5 part of a carbodiimide type curing agent ("V03": manufactured by Nisshinbo Chemical, Inc.; a toluene solution with a solid portion of 50% by mass), and 0.01 part of an imidazole compound ("1B2PZ": manufactured by Shikoku Chemicals Corp.) were added; and then, a resulting mixture was uniformly dispersed by means of a high speed rotation mixer to obtain a resin composition.

Comparative Example 3

Into 5 parts of MEK, 1 part of a polybutadiene epoxy resin ("JP-100": manufactured by Nippon Soda Co., Ltd.; epoxy equivalent of about 210 g/eq.) and 3.5 parts of an epoxy resin ("ZX1059": manufactured by Nippon Steel Chemical & Material Co., Ltd.; epoxy equivalent of about 165 g/eq.; a 1:1 mixture of a bisphenol A epoxy resin and a bisphenol F epoxy resin) were dissolved. To this solution, 33 parts of spherical silica ("SO-C2": manufactured by Admatechs Co., Ltd.; average particle diameter of 0.77 μm) surface-modified with an amino silane coupling agent ("KBM-573": manufactured by Shin-Etsu Chemical Co., Ltd.), 10 parts of an active ester type curing agent ("HPC-8150-60T": manufactured by DIC Corp.; a toluene solution with a solid portion of 60% by mass), 1 part of a triazine-containing cresol novolak resin ("LA-3018-50P": manufactured by DIC Corp.; a nitrogen content of 18%; a propylene glycol monomethyl ether solution with a solid portion of 50% by mass), 0.5 part of a carbodiimide type curing agent ("V03": manufactured by Nisshinbo Chemical, Inc.; a toluene solution with a solid portion of 50%; by mass), and 0.01 part of an imidazole compound ("1B2PZ": manufactured by Shikoku Chemicals Corp.) were added; and then, a resulting mixture was uniformly dispersed by means of a high speed rotation mixer to obtain a resin composition.

Production Example 1: Resin Sheet Having Resin Composition Layer with Thickness of 40 μm A polyethylene terephthalate film having a releasing layer ("AL5": manufactured by Lintec Corp.; thickness of 38 μm) was prepared as a support. Onto the releasing layer of this support, the resin composition obtained in each of Examples and Comparative Examples was uniformly applied such that the thickness of the resin composition layer after drying became 40 μm. Then, the resin composition was dried at 80 to 100° C. (average of 90° C.) for 4 minutes to obtain a resin sheet including the support and the resin composition layer.

Production Example 2: Resin Sheet Having Resin Composition Layer with Thickness of 25 μm Similarly to Production Example 1, the resin composition obtained in each of Examples and Comparative Examples was uniformly applied such that the thickness of the resin composition layer after drying became 25 μm. Then, the resin composition was dried at 70 to 80° C. (average of 75° C.) for 2.5 minutes to obtain a resin sheet including the support and the resin composition layer.

Test Example 1: Evaluation of Warp

The resin sheet having the thickness of 40 μm prepared in Production Example 1 was laminated to one surface of a core material ("E700GR": manufactured by Hitachi Chemical Co., Ltd.; size of 16 cm×12 cm) having a copper thereof with the thickness of 200 μm totally etched out such that the resin composition layer was bonded on both sides of the inner layer substrate by using a batch type vacuum pressure laminator (two stage build up laminator "CVP700": manufactured by Nikko-Materials Co., Ltd.). After the pressure was reduced for 30 seconds to 13 hPa or less, the lamination was carried out by press-bonding at 100° C. with the pressure of 0.74 MPa for 30 seconds, followed by heating in an oven at 130° C. for 30 minutes; and then, after transferring to an oven at 170° C., heating was carried out at this temperature for 30 minutes. After this was taken out from the oven to a room temperature atmosphere, the support was removed, and then further heating was carried out in an oven at 200° C. for 90 minutes. The test sample thus obtained was taken out to a room temperature atmosphere so as to be cooled. Then, one long side of the test sample was fixed onto a flat plate; and the height of the other long side from the plate was measured to determine a warp amount in the short side direction. When the warp amount was less than 10 μm, this was expressed with the symbol "○", and when the warp amount was 10 μm or more, this was expressed with the symbol "X".

Test Example 2: Evaluation of Crack after Desmear Treatment

The resin sheet having the thickness of 25 μm prepared in Production Example 2 was laminated on both surfaces of a core material ("E705GR": manufactured by Hitachi Chemical Co., Ltd.; thickness of 400 μm) having circular copper pads (copper thickness of 35 μm) with the diameter of 350 μm formed in a grid pattern with distance of 400 μm and residual copper rate of 60% such that the resin composition layer was bonded on both sides of the inner layer substrate by using a batch type vacuum pressure laminator (two stage build up laminator "CVP700": manufactured by Nikko-Materials Co., Ltd.). After the pressure was reduced for 30 seconds to 13 hPa or less, the lamination was carried out by press-bonding at 100° C. with the pressure of 0.74 MPa for 30 seconds, followed by heating in an oven at 130° C. for 30 minutes; and then, after transferring to an oven at 170° C., heating was carried out at this temperature for 30 minutes. After the support was removed, a circuit board thereby obtained was soaked in a swelling liquid (Swelling Dip Securiganth P: manufactured by Atotech Japan Co., Ltd.) at 60° C. for 10 minutes. Next, the circuit board was soaked in a roughening liquid (Concentrate Compact P: manufactured by Atotech Japan Co., Ltd.; an aqueous solution of 60 g/L $KMnO_4$ and 40 g/L NaOH) at 80° C. for 30 minutes. Finally, the circuit board was soaked in a neutralization solution (Reduction Solution Securiganth P: manufactured by Atotech Japan Co., Ltd.) at 40° C. for 5 minutes. Cracks in the resin composition layer were counted by observing 100 copper pad portions of the circuit board after the roughening treatment. When the number of cracks was 10 or less, this was expressed with the symbol "○", and when the number of cracks was more than 10, this was expressed with the symbol "X".

Use amounts of non-volatile components in the resin compositions of Examples and Comparative Examples as well as evaluation results of Test Examples are summarized in Table 1 below.

TABLE 1

| | | | | | Example 1 | Example 2 | Example 3 | Example 4 | Example 5 | Example 6 |
|---|---|---|---|---|---|---|---|---|---|---|
| Non-volatile Components (part by mass) | (A) | Polyolefin Epoxy Resin | (210 g/eq.) | JP100 | 1 | | | 1 | 1 | 1 |
| | | | (225 g/eq.) | JP200 | | | | | | |
| | | | (230 g/eq.) | JP400 | | | | | | |
| | | | (193 g/eq.) | PB3600 | | | | | | |
| | (B) | Epoxy Resin having Condensed Polycyclic Aromatic Hydrocarbon | | HP-4032-SS | 3.5 | 3.5 | 3.5 | | | |
| | | | | ESN475V | | | | 3.5 | | |
| | | | | HP-6000-L | | | | | 3.5 | |
| | | | | EXA-7311-G4S | | | | | | 3.5 |
| | | Other Epoxy Resin | | ZX1059 | | | | | | |
| | (C) | Nitrogen-containing Novolak Resin | (Cresol)(N18%) (Phenol)(N12%) | LA-3018-50P | 0.5 | 0.5 | 0.5 | 0.25 | 0.25 | 0.25 |
| | | | | LA-7054 | | | | | | |
| | (D) | Inorganic Filler | | SO-C2 | 35 | 35 | 35 | 25 | 30 | 31 |
| | (E) | Curing Agent | | HPC-8150-60T | 6.6 | 6.6 | 6.6 | 3.6 | 5.4 | 5.7 |
| | | | | HPC-8000-65T | | | | | | |
| | | | | V-03 | 0.25 | 0.25 | 0.25 | 0.25 | 0.25 | 0.25 |
| | (F) | Curing Accelerator | | 1B2PZ | 0.01 | 0.01 | 0.01 | 0.01 | 0.01 | 0.01 |
| | | Total of Non-volatile Components | | | 46.86 | 46.85 | 46.86 | 33.61 | 40.41 | 41.71 |
| In Resin Composition (Non-volatile Components) | | Content of (A) component (% by mass) | | | 2.1 | 2.1 | 2.1 | 3.0 | 2.5 | 2.4 |
| | | Content of (B) component (% by mass) | | | 7.5 | 7.5 | 7.5 | 10.4 | 8.7 | 8.4 |
| | | Content of (C) component (% by mass) | | | 1.1 | 1.1 | 1.1 | 0.7 | 0.6 | 0.6 |
| | | Content of (D) component (% by mass) | | | 74.7 | 74.7 | 74.7 | 74.4 | 74.2 | 74.3 |
| | | Content of (E) component (% by mass) | | | 14.6 | 14.6 | 14.6 | 11.5 | 14.0 | 14.3 |
| | | Content of (F) component (% by mass) | | | 0.02 | 0.02 | 0.02 | 0.03 | 0.02 | 0.02 |
| Characteristic Evaluations | | Warp | | | ○ | ○ | ○ | ○ | ○ | ○ |
| | | Crack after Desmear | | | ○ | ○ | ○ | ○ | ○ | ○ |

| | | | | | Example 7 | Example 8 | Comparative Example 1 | Comparative Example 2 | Comparative Example 3 |
|---|---|---|---|---|---|---|---|---|---|
| Non-volatile Components (part by mass) | (A) | Polyolefin Epoxy Resin | (210 g/eq.) | JP100 | 1 | 1 | | 1 | 1 |
| | | | (225 g/eq.) | JP200 | | | | | |
| | | | (230 g/eq.) | JP400 | | | | | |
| | | | (193 g/eq.) | PB3600 | | | 1 | | |
| | (B) | Epoxy Resin having Condensed Polycyclic Aromatic Hydrocarbon | | HP-4032-SS | 3.5 | 3.5 | 3.5 | 3.5 | |
| | | | | ESN475V | | | | | |
| | | | | HP-6000-L | | | | | |
| | | | | EXA-7311-G4S | | | | | |
| | | Other Epoxy Resin | | ZX1059 | | | | | 3.5 |
| | (C) | Nitrogen-containing Novolak Resin | (Cresol)(N18%) (Phenol)(N12%) | LA-3018-50P | 0.5 | 2.5 | 0.5 | | 0.5 |
| | | | | LA-7054 | | | | 0.6 | |
| | (D) | Inorganic Filler | | SO-C2 | 35 | 21 | 35 | 33 | 33 |
| | (E) | Curing Agent | | HPC-8150-60T | | | 6.6 | 6 | 6 |
| | | | | HPC-8000-65T | 6.825 | | | | |
| | | | | V-03 | 0.25 | 0.25 | 0.25 | 0.25 | 0.25 |
| | (F) | Curing Accelerator | | 1B2PZ | 0.01 | 0.01 | 0.01 | 0.01 | 0.01 |
| | | Total of Non-volatile Components | | | 47.085 | 28.26 | 46.86 | 44.36 | 44.26 |

TABLE 1-continued

| | | | | | | | |
|---|---|---|---|---|---|---|---|
| In Resin Composition (Non-volatile Components) | Content of (A) component (% by mass) | 2.1 | 3.5 | 2.1 | 2.3 | 2.3 |
| | Content of (B) component (% by mass) | 7.4 | 12.4 | 7.5 | 7.9 | |
| | Content of (C) component (% by mass) | 1.1 | 8.8 | 1.1 | 1.4 | 1.1 |
| | Content of (D) component (% by mass) | 74.3 | 74.3 | 74.7 | 74.4 | 74.6 |
| | Content of (E) component (% by mass) | 15.0 | 0.9 | 14.6 | 14.1 | 14.1 |
| | Content of (F) component (% by mass) | 0.02 | 0.04 | 0.02 | 0.02 | 0.02 |
| Characteristic Evaluations | Warp | ○ | ○ | X | ○ | X |
| | Crack after Desmear | ○ | ○ | X | X | ○ |

It is found that when the resin composition including (A) the polyolefin epoxy resin having an epoxy equivalent of 200 g/eq. or more, (B) the epoxy resin having the condensed polycyclic aromatic hydrocarbon, (C) the nitrogen-containing novolak resin having a nitrogen content of 13% by mass or more and/or having the cresol novolak structure, and (D) the inorganic filler is used, the cured product having a suppressed warp as well as a superior crack resistance can be obtained.

What is claimed is:

1. A resin composition, comprising:
   (A) at least one polybutadiene epoxy resin;
   (B) at least one epoxy resin having one or more naphthalene rings and two or more epoxy groups in one molecule;
   (C) at least one triazine-containing novolak resin having a cresol novolak structure; and
   (D) at least one silica, wherein
   an epoxy equivalent of said (A) at least one polybutadiene epoxy resin is 200 g/eq. or more and 250 g/eq. or less,
   a nitrogen content in said (C) at least one triazine-containing novolak resin having a cresol novolak structure is 16% by mass or more and 22% by mass or less,
   a content of said (A) at least one polybutadiene epoxy resin is 1.5% by mass or more and 10% by mass or less based on 100% by mass of non-volatile components in said resin composition,
   a content of said (B) at least one epoxy resin having one or more naphthalene rings and two or more epoxy groups in one molecule is 5% by mass or more and 20% by mass or less based on 100% by mass of non-volatile components in said resin composition,
   a content of said (C) at least one triazine-containing novolak resin having a cresol novolak structure is 0.5% by mass or more and 10% by mass or less based on 100% by mass of non-volatile components in said resin composition, and
   a content of said (D) at least one silica is 60% by mass or more and 90% by mass or less based on 100% by mass of non-volatile components in said resin composition.

2. The resin composition according to claim 1, wherein a number-average molecular weight (Mn) of said (A) at least one polybutadiene epoxy resin is 4,000 or less.

3. The resin composition according to claim 1, wherein an epoxy equivalent of said (B) at least one epoxy resin having one or more naphthalene rings and two or more epoxy groups in one molecule is 130 g/eq. to 400 g/eq.

4. The resin composition according to claim 1, wherein a mass ratio of said (A) at least one polybutadiene epoxy resin to said (B) at least one epoxy resin having one or more naphthalene rings and two or more epoxy groups in one molecule (content of (A) content of (B)) is 0.1 or more and 0.5 or less.

5. The resin composition according to claim 1, wherein a hydroxy equivalent of said (C) at least one triazine-containing novolak resin having a cresol novolak structure is 130 g/eq. or more.

6. The resin composition according to claim 1, wherein said (D) at least one silica is present in an amount of 70% by mass or more and 90% by mass or less based on 100% by mass of non-volatile components in said resin composition.

7. The resin composition according to claim 1, further comprising:
   (E) at least one curing agent as a component other than said (C) at least one triazine-containing novolak resin having a cresol novolak structure.

8. The resin composition according to claim 7, wherein said (E) at least one curing agent comprises an active ester curing agent.

9. A cured product of the resin composition according to claim 1.

10. A sheet lamination material, comprising the resin composition according to claim 1.

11. A resin sheet, comprising:
    (1) a support; and
    (2) a layer of the resin composition according to claim 1 and formed on said support.

12. A printed wiring board, comprising an insulating layer comprising a cured product of the resin composition according to claim 1.

13. A semiconductor device, comprising the printed wiring board according to claim 12.

* * * * *